(12) United States Patent
Latham et al.

(10) Patent No.: US 9,790,836 B2
(45) Date of Patent: Oct. 17, 2017

(54) LOOSE-FILL INSULATION EXHAUST GAS TREATMENT DEVICE AND METHODS OF MANUFACTURING

(71) Applicant: Tenneco Automotive Operating Company Inc., Lake Forest, IL (US)

(72) Inventors: Ruth Ann Latham, Ann Arbor, MI (US); William V. Alcini, Ann Arbor, MI (US); Michael A. Golin, Dexter, MI (US); Michael Joseph Torzewski, Milan, MI (US); Steven A. Freis, Ann Arbor, MI (US); Mark Ernest Kluesner, Grass Lake, MI (US); Gabriel S. Salanta, Ann Arbor, MI (US); Stephen Joe Myers, Owosso, MI (US)

(73) Assignee: Tenneco Automotive Operating Company, Inc., Lake Forest, IL (US)

( * ) Notice: Subject to any disclaimer, the term of this patent is extended or adjusted under 35 U.S.C. 154(b) by 567 days.

(21) Appl. No.: 14/085,576

(22) Filed: Nov. 20, 2013

(65) Prior Publication Data

US 2014/0161677 A1 Jun. 12, 2014

Related U.S. Application Data

(63) Continuation-in-part of application No. 13/828,444, filed on Mar. 14, 2013.
(Continued)

(51) Int. Cl.
*F01N 3/28* (2006.01)
*F01N 13/18* (2010.01)
(Continued)

(52) U.S. Cl.
CPC .............. *F01N 13/18* (2013.01); *F01N 1/006* (2013.01); *F01N 1/04* (2013.01); *F01N 13/141* (2013.01);
(Continued)

(58) Field of Classification Search
CPC . F01N 13/18; F01N 1/04; F01N 1/006; F01N 13/141; F01N 2310/12;
(Continued)

(56) References Cited

U.S. PATENT DOCUMENTS

| 1,934,174 A | 11/1933 | Dyckerhoff |
| 2,937,662 A | 5/1960 | Green |

(Continued)

FOREIGN PATENT DOCUMENTS

| CA | 956432 A1 | 10/1974 |
| CN | 1659369 A | 8/2005 |

(Continued)

OTHER PUBLICATIONS

Office Action for U.S. Appl. No. 13/828,444 dated Sep. 23, 2015.
(Continued)

*Primary Examiner* — Jun Yoo
(74) *Attorney, Agent, or Firm* — Thompson Coburn, LLP

(57) ABSTRACT

An exhaust gas treatment device, which includes an outer layer, an inner layer that is at least in part disposed within the outer layer, and a loose-fill insulation disposed in the volume between the outer layer and the inner layer, where a piece of fiber mat is disposed between the outer layer and the inner layer and forms a barrier that at least partially prevents the loss of the loose-fill insulation from the volume between the outer layer and the inner layer and a manufacturing method that includes placing a loose-fill insulation into the volume of space between an inner layer and an outer layer and positioning a piece of fiber mat between the outer layer and
(Continued)

the inner layer to form a barrier that at least partially prevents the loss of the loose-fill insulation from the volume of space between the outer and inner layers.

14 Claims, 17 Drawing Sheets

Related U.S. Application Data

(60) Provisional application No. 61/762,161, filed on Feb. 7, 2013, provisional application No. 61/849,811, filed on Nov. 20, 2012.

(51) Int. Cl.
  *F01N 13/14* (2010.01)
  *F01N 1/00* (2006.01)
  *F01N 1/04* (2006.01)

(52) U.S. Cl.
  CPC ...... *F01N 2310/12* (2013.01); *F01N 2470/02* (2013.01); *Y02T 10/22* (2013.01); *Y10T 29/49398* (2015.01)

(58) Field of Classification Search
  CPC .......... F01N 2470/02; F01N 1/10; F01N 1/24; Y02T 10/22; Y10T 29/49398; B01D 46/10; B01D 53/94; B60K 13/04
  See application file for complete search history.

(56) References Cited

U.S. PATENT DOCUMENTS

| | | | |
|---|---|---|---|
| 3,104,732 A | 9/1963 | Ludlow | |
| 3,104,735 A | 9/1963 | Ludlow et al. | |
| 3,133,612 A | 5/1964 | Sailer | |
| 3,152,033 A | 10/1964 | Black et al. | |
| 3,173,451 A | 3/1965 | Edwards | |
| 3,181,646 A | 5/1965 | Edwards | |
| 3,230,981 A | 1/1966 | Levenetz | |
| 3,259,206 A | 7/1966 | Straw | |
| 3,307,590 A | 3/1967 | Carlson | |
| 3,354,021 A | 11/1967 | Royet | |
| 3,495,680 A | 2/1970 | Willette | |
| 3,499,269 A | 3/1970 | Bois | |
| 3,500,954 A | 3/1970 | Willette | |
| 3,654,966 A | 4/1972 | Waksman | |
| 3,658,614 A | 4/1972 | Beck | |
| 3,670,845 A | 6/1972 | Betts | |
| 3,863,445 A | 2/1975 | Heath | |
| 3,864,909 A | 2/1975 | Kern | |
| 3,865,159 A * | 2/1975 | Mayfield | F01N 3/28 141/340 |
| 3,886,981 A | 6/1975 | Eliason | |
| 3,908,372 A | 9/1975 | Fowler et al. | |
| 3,919,755 A | 11/1975 | Kaneko et al. | |
| 3,963,445 A * | 6/1976 | Koyama | F01N 3/2853 138/108 |
| 4,059,712 A | 11/1977 | Bothwell | |
| 4,168,610 A | 9/1979 | Engquist | |
| 4,197,704 A | 4/1980 | Date et al. | |
| 4,264,660 A | 4/1981 | Siebels | |
| 4,307,756 A | 12/1981 | Voigt et al. | |
| 4,444,420 A | 4/1984 | McStravick et al. | |
| 4,501,302 A | 2/1985 | Harwood | |
| 4,750,251 A | 6/1988 | Motley et al. | |
| 4,782,661 A | 11/1988 | Motley et al. | |
| 4,877,689 A | 10/1989 | Onstott | |
| 4,884,400 A | 12/1989 | Tanaka et al. | |
| 5,004,018 A | 4/1991 | Bainbridge | |
| 5,024,289 A | 6/1991 | Merry | |
| 5,031,401 A | 7/1991 | Hinderks | |
| 5,160,769 A | 11/1992 | Garrett | |
| 5,163,289 A | 11/1992 | Bainbridge | |
| 5,293,743 A | 3/1994 | Usleman et al. | |
| 5,400,830 A | 3/1995 | Stiles et al. | |
| 5,438,828 A | 8/1995 | Fukae | |
| 5,479,706 A | 1/1996 | Tamano et al. | |
| 5,530,213 A | 6/1996 | Hartsock et al. | |
| 5,606,857 A | 3/1997 | Harada | |
| 5,626,951 A | 5/1997 | Hogenson | |
| 5,697,215 A | 12/1997 | Canevet et al. | |
| 5,839,277 A | 11/1998 | Ideta et al. | |
| 5,907,134 A | 5/1999 | Nording et al. | |
| 5,996,228 A | 12/1999 | Shoji et al. | |
| 6,026,846 A | 2/2000 | Wolf et al. | |
| 6,038,769 A | 3/2000 | Bonny et al. | |
| 6,159,430 A | 12/2000 | Foster | |
| 6,317,959 B1 * | 11/2001 | Nilsson | F16L 59/14 29/455.1 |
| 6,319,444 B1 | 11/2001 | Kirk | |
| 6,408,980 B1 | 6/2002 | Dooley | |
| 6,555,070 B1 | 4/2003 | Kruger | |
| 6,625,979 B2 | 9/2003 | Sugaya et al. | |
| 6,648,099 B2 | 11/2003 | Dooley | |
| 6,681,890 B1 | 1/2004 | Chen et al. | |
| 6,705,012 B1 | 3/2004 | Harle et al. | |
| 6,857,502 B2 | 2/2005 | Naito | |
| 6,902,710 B2 | 6/2005 | Schnigenberg | |
| 6,960,386 B2 | 11/2005 | Agata | |
| 6,990,804 B2 | 1/2006 | Jacob et al. | |
| 7,252,731 B2 | 8/2007 | Kaneko et al. | |
| 7,404,253 B2 | 7/2008 | Alles et al. | |
| 7,585,559 B2 | 9/2009 | Schroeder et al. | |
| 7,938,148 B2 | 5/2011 | Carlier et al. | |
| 8,091,342 B2 | 1/2012 | Perry et al. | |
| 8,127,538 B2 | 3/2012 | Pollitt et al. | |
| 8,163,250 B2 | 4/2012 | Okabe | |
| 8,168,273 B2 | 5/2012 | Tomosue et al. | |
| 8,209,965 B2 | 7/2012 | Mabuchi | |
| 2004/0142152 A1 | 7/2004 | Chen et al. | |
| 2005/0276732 A1 | 12/2005 | Saito | |
| 2006/0070554 A1 | 4/2006 | Braunreiter et al. | |
| 2006/0096262 A1 | 5/2006 | Andersen et al. | |
| 2006/0124387 A1 | 6/2006 | Berbner et al. | |
| 2006/0278323 A1 | 12/2006 | Eguchi | |
| 2007/0098954 A1 | 5/2007 | Kozerski | |
| 2007/0151798 A1 | 7/2007 | Smith | |
| 2007/0178024 A1 | 8/2007 | Sarda | |
| 2008/0241007 A1 | 10/2008 | Hardesty | |
| 2009/0049690 A1 | 2/2009 | Eguchi | |
| 2009/0060800 A1 | 3/2009 | Fernandes, Jr. | |
| 2009/0090486 A1 | 4/2009 | Geskes et al. | |
| 2009/0113709 A1 | 5/2009 | Mueller et al. | |
| 2009/0148356 A1 | 6/2009 | Okabe | |
| 2009/0277162 A1 | 11/2009 | Cominetti et al. | |
| 2010/0111779 A1 | 5/2010 | Redmann et al. | |
| 2010/0157741 A1 | 6/2010 | Drumheller et al. | |
| 2010/0236697 A1 | 9/2010 | Yoshimi et al. | |
| 2010/0239469 A1 | 9/2010 | Olivier et al. | |
| 2011/0036063 A1 | 2/2011 | Kumar | |
| 2012/0079697 A1 | 4/2012 | Myers | |
| 2012/0266999 A1 | 10/2012 | Wirth | |
| 2012/0279606 A1 * | 11/2012 | Teso, Jr. | F01N 13/14 138/140 |
| 2012/0312630 A1 | 12/2012 | Sakae | |
| 2012/0324872 A1 | 12/2012 | Jaruvatee et al. | |
| 2013/0171035 A1 | 7/2013 | Wikaryasz et al. | |
| 2014/0102083 A1 | 4/2014 | Baetge et al. | |

FOREIGN PATENT DOCUMENTS

| | | | |
|---|---|---|---|
| CN | 2744838 Y | * | 12/2005 |
| CN | 101033703 A | | 9/2007 |
| CN | 100398790 C | | 7/2008 |
| CN | 101821488 A | | 9/2010 |
| CN | 102458094 A | | 5/2012 |
| CN | 102883818 A | | 1/2013 |
| DE | 1199563 B | | 8/1965 |
| DE | 2406650 A1 | | 8/1974 |
| DE | 2751918 A1 | | 5/1979 |
| DE | 3044872 A1 | | 8/1982 |
| DE | 3238330 A1 | | 4/1984 |

(56) References Cited

FOREIGN PATENT DOCUMENTS

| | | |
|---|---|---|
| DE | 3333591 A1 | 3/1985 |
| DE | 3432744 A1 | 3/1986 |
| DE | 3521467 A1 | 12/1986 |
| DE | 3534757 A1 | 4/1987 |
| DE | 3603170 A1 | 8/1987 |
| DE | 3642714 A1 | 6/1988 |
| DE | 3720714 A1 | 1/1989 |
| DE | 3926429 A1 | 2/1991 |
| DE | 3929205 A1 | 3/1991 |
| DE | 4316959 A1 | 11/1994 |
| DE | 4426313 A1 | 2/1995 |
| DE | 4437380 A1 | 7/1995 |
| DE | 4414738 A1 | 11/1995 |
| DE | 19527634 A1 | 1/1997 |
| DE | 19825762 A1 | 12/1998 |
| DE | 19738622 A1 | 3/1999 |
| DE | 10010112 A1 | 9/2001 |
| DE | 10105841 A1 | 8/2002 |
| DE | 10127200 A1 | 12/2002 |
| DE | 20220500 U1 | 8/2003 |
| DE | 10248781 B3 | 2/2004 |
| DE | 202004000200 U1 | 4/2004 |
| DE | 10334307 A1 | 3/2005 |
| DE | 10359062 A1 | 7/2005 |
| DE | 19815170 C5 | 4/2006 |
| DE | 102008061555 A1 | 1/2011 |
| DE | 102010021438 A1 | 12/2011 |
| DE | 102010031855 A1 | 1/2012 |
| DE | 102011007854 A1 | 10/2012 |
| DE | 102011121383 A1 | 6/2013 |
| DE | 202013100338 U1 | 8/2013 |
| DE | 202013103103 U1 | 8/2013 |
| DE | 202013103115 U1 | 8/2013 |
| EP | 95215 A2 | 11/1983 |
| EP | 112634 A1 | 7/1984 |
| EP | 112706 A1 | 7/1984 |
| EP | 340946 A2 | 11/1989 |
| EP | 342661 A1 | 11/1989 |
| EP | 431405 A1 | 6/1991 |
| EP | 486427 A1 | 5/1992 |
| EP | 490461 A1 | 6/1992 |
| EP | 505759 A2 | 9/1992 |
| EP | 542124 A1 | 5/1993 |
| EP | 0547739 A1 | 6/1993 |
| EP | 643203 A1 | 3/1995 |
| EP | 698482 A2 | 2/1996 |
| EP | 875371 A1 | 11/1998 |
| EP | 896184 A2 | 2/1999 |
| EP | 916483 A2 | 5/1999 |
| EP | 992659 A2 | 4/2000 |
| EP | 1031782 A2 | 8/2000 |
| EP | 1156197 A1 | 11/2001 |
| EP | 1288603 A2 | 3/2003 |
| EP | 1411218 A2 | 4/2004 |
| EP | 1431651 A2 | 6/2004 |
| EP | 1464800 A1 | 10/2004 |
| EP | 1503133 A2 | 2/2005 |
| EP | 1589200 A1 | 10/2005 |
| EP | 1718895 A1 | 11/2006 |
| EP | 1793100 A1 | 6/2007 |
| EP | 1915519 A1 | 4/2008 |
| EP | 2444616 A1 | 4/2012 |
| EP | 2444617 A1 | 4/2012 |
| EP | 2444618 A1 | 4/2012 |
| FR | 2869949 A1 | 11/2005 |
| FR | 2869950 A1 | 11/2005 |
| FR | 2881505 A1 | 8/2006 |
| FR | 2917779 A1 | 12/2008 |
| FR | 2919209 A1 | 1/2009 |
| GB | 2166512 A | 5/1986 |
| GB | 2425073 A | 10/2006 |
| JP | S52129818 A | 10/1977 |
| JP | H01227813 A | 9/1989 |
| JP | H06241016 A | 8/1994 |
| JP | H06346728 A | 12/1994 |
| JP | H0821233 A | 1/1996 |
| JP | H10103052 A | 4/1998 |
| JP | H11303632 A | 11/1999 |
| JP | 2000027638 A | 1/2000 |
| JP | 3118991 B2 | 12/2000 |
| JP | 2001303951 A | 10/2001 |
| JP | 2003041924 A | 2/2003 |
| JP | 2003113996 A | 4/2003 |
| JP | 2004211659 A | 7/2004 |
| JP | 2005220821 A | 8/2005 |
| JP | 3853132 B2 | 12/2006 |
| JP | 3944054 82 | 7/2007 |
| JP | 4119006 B2 | 7/2008 |
| JP | 2008169720 A | 7/2008 |
| JP | 4376386 B2 | 12/2009 |
| JP | 2010084700 A | 4/2010 |
| JP | 2011149338 A | 8/2011 |
| KR | 200448965 Y1 | 6/2010 |
| WO | 7900623 A1 | 9/1979 |
| WO | 9853113 A1 | 11/1998 |
| WO | 2004036108 A2 | 4/2004 |
| WO | 2005061280 A1 | 7/2005 |
| WO | 2006087441 A1 | 8/2006 |
| WO | 2006097608 A1 | 9/2006 |
| WO | 2007065491 A1 | 6/2007 |
| WO | 2007080335 A2 | 7/2007 |
| WO | 2007097639 A1 | 8/2007 |
| WO | 2008152311 A2 | 12/2008 |
| WO | 2009032147 A2 | 3/2009 |
| WO | 2009080948 A2 | 7/2009 |
| WO | 2010029946 A1 | 3/2010 |
| WO | 2011019396 A2 | 2/2011 |
| WO | 2013009344 A1 | 1/2013 |

OTHER PUBLICATIONS

Microtherm Free Flow, Material Safety Data Sheet, Issue No. 9, dated Oct. 3, 2011.

Microtherm webpage, Internet Archive Wayback Machine, http://www.microtherm.uk.com/high/EXEN/site/products-overview.aspx?k=6&l=1, dated May 24, 2011.

Advisory Action for U.S. Appl. No. 13/828,444 dated Aug. 10, 2016.

Office Action for U.S. Appl. No. 13/828,444 dated Apr. 27, 2016.

* cited by examiner

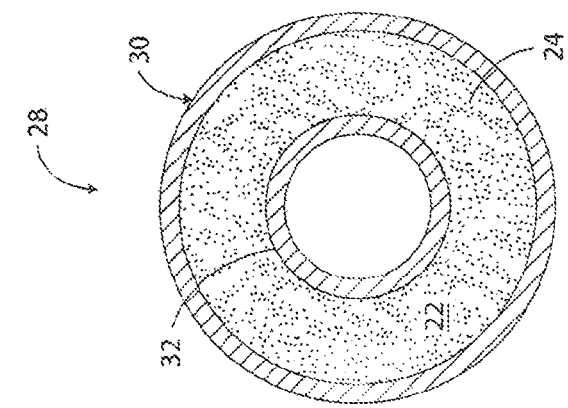
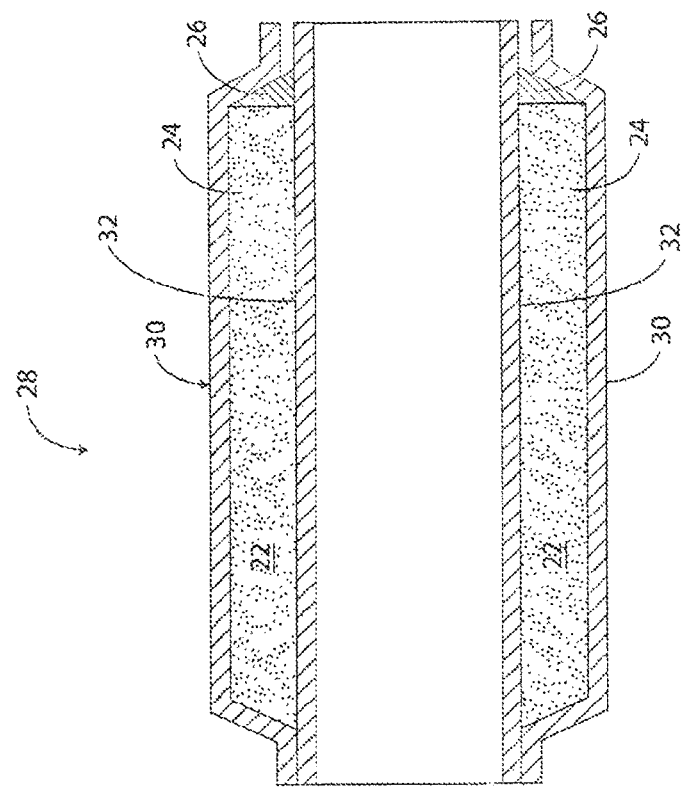
FIG. 3b
FIG. 3a

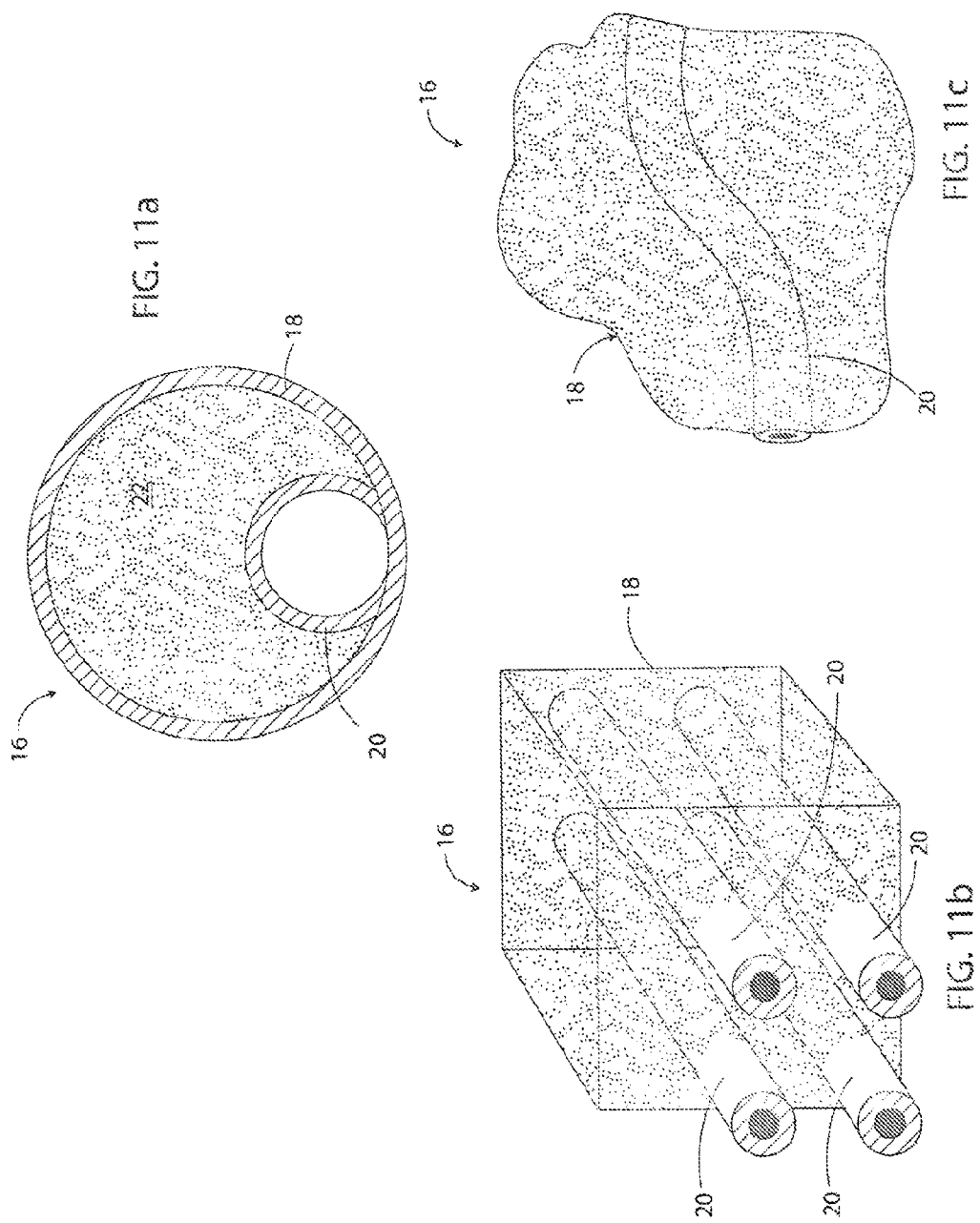

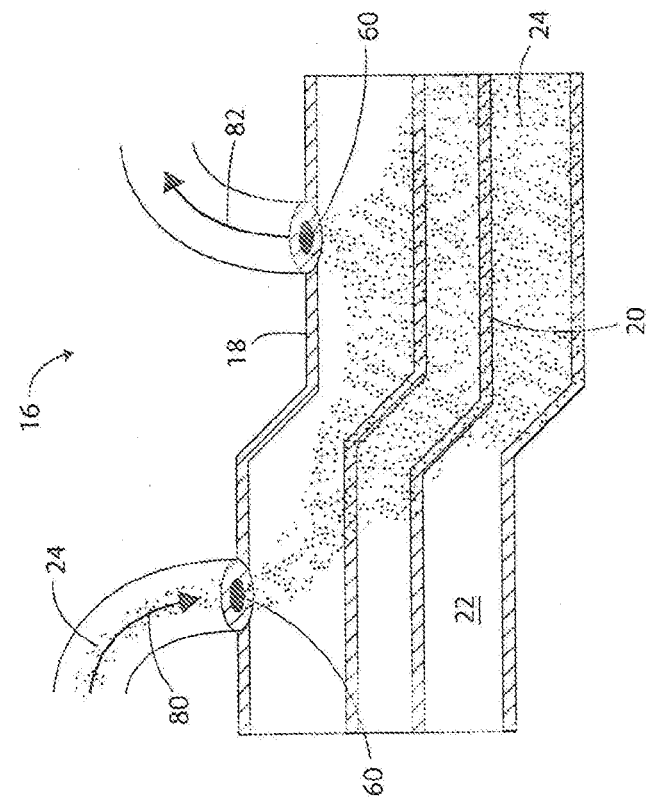
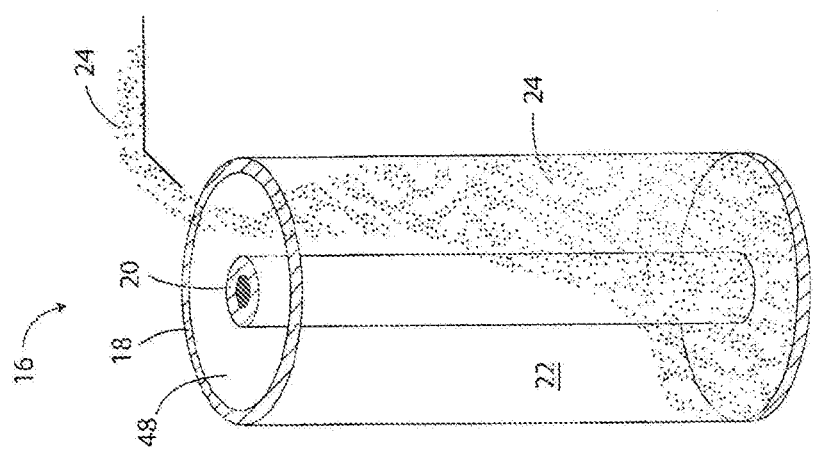

Detail Drawing of Hole Covered with Screen Construction

LOOSE-FILL INSULATION EXHAUST GAS TREATMENT DEVICE AND METHODS OF MANUFACTURING

CROSS-REFERENCE TO RELATED APPLICATIONS

This patent application is a continuation-in part patent application and claims priority to and benefit under 35 U.S.C. §120 of U.S. patent application Ser. No. 13/828,444 filed Mar. 14, 2013, and claims priority to and benefit under 35 U.S.C. §119(e) of U.S. Provisional Application No. 61/849,811, filed Nov. 20, 2012, and U.S. Provisional Application No. 61/762,161, filed Feb. 7, 2013, all three patent applications of which are incorporated by reference in their entireties.

BACKGROUND OF THE INVENTION

It is known in the automotive industry to include an exhaust gas treatment device or system such as one utilizing an exhaust manifold, muffler, gasoline particulate filters or diesel particulate filters and/or one or more catalytic units, such as a catalytic converter, diesel oxidation catalyst unit, or selective catalytic reduction catalyst unit, to collect, direct, provide acoustic benefits and/or improve the emissions in the exhaust. Currently, what are generally referred to as batts, blankets, or mats are utilized in exhaust gas systems in order to provide thermal insulation and/or resilient mounting structure for acoustic and aftertreatment devices of the system to control the heat exchange to and from the devices and/or provide a protective mount for a core or other fragile component of the devices.

SUMMARY OF INVENTION

In one aspect of the present invention, an exhaust gas treatment device is disclosed. The exhaust gas treatment device includes an outer layer, an inner layer that is at least in part disposed within the outer layer, and a loose-fill insulation disposed in the volume of space between the outer layer and the inner layer. A piece of fiber mat is also disposed between the outer layer and the inner layer and forms a barrier that at least partially prevents the loss of the loose-fill insulation from the volume between the outer layer and the inner layer.

In another aspect of the present invention a method for manufacturing an exhaust gas treatment device is disclosed. The method includes placing a loose-fill insulation into the volume of space between an inner layer and an outer layer of a gas exhaust device and positioning a piece of fiber mat between the outer layer and the inner layer to form a barrier that at least partially prevents the loss of the loose-fill insulation from the volume of space between the outer layer and the inner layer.

In another aspect of the present invention, an exhaust gas treatment device of the invention comprises a volume of space between the outer layer and the inner layer that is contained within an airtight chamber. In certain embodiments, this airtight chamber contains loose-fill insulation. In another aspect of the invention, a method of manufacturing an exhaust gas treatment device of the invention is disclosed, the method comprising placing a loose-fill insulation into the volume of space between an inner layer and an outer layer and sealing the volume of space in an airtight chamber.

In another aspect of the invention, an exhaust gas treatment device of the invention comprises a loose-fill insulation that is capable of absorbing moisture. In another aspect of the invention, a method of manufacturing an exhaust gas treatment device of the invention is disclosed wherein a loose-fill insulation is capable of absorbing moisture is used in manufacturing the device. In another aspect of the invention, a method of thermal insulation within an exhaust gas treatment device of the invention is disclosed, wherein the method comprises providing moisture to the loose-fill insulation so that moisture is absorbed in the loose-fill insulation and providing a heated exhaust gas to the device, wherein the heat from the exhaust gas converts the moisture absorbed in the loose-fill insulation into a gas or steam.

In another aspect of the invention, an exhaust gas treatment device of the invention is configured to allow for airflow through the volume between the outer layer and the inner layer. In certain embodiments, the device is configured to direct airflow through the volume between the outer layer and the inner layer. In certain embodiments, the device is configured to force airflow through the volume between the outer layer and the inner layer. In another aspect of the invention, a method of manufacturing an exhaust gas treatment device of the invention is provided wherein the exhaust gas treatment device of the invention is configured to allow for airflow through the volume between the outer layer and the inner layer. In certain embodiments, the device is configured to direct airflow through the volume between the outer layer and the inner layer. In certain embodiments, the device is configured to force airflow through the volume between the outer layer and the inner layer. In another aspect of the invention, a method of thermal insulation from an exhaust gas treatment device of the invention is disclosed that comprises passing air through the volume of space between the inner layer and the outer layer, for example, forcing air through the volume of space between the inner layer and the outer layer.

In particular, one aspect of the invention provides for an exhaust gas treatment device. The exhaust gas treatment device comprises an outer layer and an inner layer that is at least in part disposed within the outer layer. A loose-fill insulation is disposed in the volume between the outer layer and the inner layer and a piece of fiber mat is disposed between the outer layer and the inner layer and forms a barrier that at least partially prevents the loss of the loose-fill insulation from the volume between the outer layer and the inner layer. In certain embodiments, the exhaust gas treatment device has an outer layer including an outer tube, an inner layer including an inner tube, or both an outer layer including an outer tube and the inner layer including an inner tube. In certain embodiments, the exhaust gas treatment device is selected from the group consisting of a manifold with a three-way catalyst, connecting pipe, a manifold, a muffler, an emissions control unit, a selective catalytic reduction (SCR) catalyst, a diesel particulate filter (DPF), a gasoline particulate filter (GPF), a thermal regeneration unit, a decomposition tube, an injector mounting location, a mixer, a DOC diesel oxidation catalyst, and a duct and a box system. In certain embodiments, the loose-fill insulation is selected from the group consisting of an aerogel, perlite, and microporous insulation. In certain embodiments, at least a portion of the outer layer is constricted to apply pressure against the piece of fiber mat or the piece of fiber mat is held in place by a clamp or a ring. In certain embodiments, the outer tube has a first end and a second end and at least a portion of at one end is tapered toward the inner tube such that it applies pressure against the piece of fiber mat. In certain embodiments, the loose-fill insulation substantially fills the volume between the outer layer and the inner layer.

In certain embodiments, at least a first piece of fiber mat is substantially disposed between the loose-fill insulation and the inner layer or it is substantially disposed between the loose-fill insulation and the outer layer. In certain embodiments, the loose-fill insulation is located between a first piece of fiber mat and a second piece of fiber mat and the first piece of fiber mat and second piece of fiber mat are disposed in the volume between the outer layer and the inner layer. In certain embodiments, the inner layer is the same as the outer surface of a substrate. In certain embodiments, the piece of fiber mat forms a barrier that at least partially prevents the loss of the loose-fill insulation through one or more openings in the inner layer or the outer layer. In certain embodiments where the piece of fiber mat forms a barrier that at least partially prevents the loss of the loose-fill insulation through one or more openings in the inner layer or the outer layer, the piece of fiber mat that forms a barrier is substantially disposed between the loose-fill insulation and the inner layer or is substantially disposed between the loose-fill insulation and the outer layer. In certain embodiments, the device further comprises an intermediate layer at least in part disposed between the outer layer and the inner layer, and wherein the loose-fill insulation is disposed between the outer layer and the intermediate layer. In certain embodiments where the device further comprises an intermediate layer at least in part disposed between the outer layer and the inner layer, and wherein the loose-fill insulation is disposed between the outer layer and the intermediate layer, a fiber insulation blanket is disposed between the intermediate layer and the inner layer. In certain embodiments, the device further comprises an intermediate layer at least in part disposed between the outer layer and the inner layer, and the loose-fill insulation is disposed between the intermediate layer and the inner layer. In certain embodiments where the device further comprises an intermediate layer at least in part disposed between the outer layer and the inner layer, and the loose-fill insulation is disposed between the intermediate layer and the inner layer, a fiber insulation blanket is disposed between the outer layer and the intermediate layer. In certain embodiments where the exhaust gas treatment device has an outer layer including an outer tube, an inner layer including an inner tube, or both an outer layer including an outer tube and the inner layer including an inner tube, the device further comprises an intermediate tube disposed between the outer tube and the inner tube, and the loose-fill insulation is disposed between the outer tube and the intermediate tube and a fiber insulation blanket is disposed between the intermediate tube and the inner tube. In certain embodiments where the exhaust gas treatment device has an outer layer including an outer tube, an inner layer including an inner tube, or both an outer layer including an outer tube and the inner layer including an inner tube, the device further comprises an intermediate tube disposed between the outer tube and the inner tube, and a fiber insulation blanket is disposed between the outer tube and the intermediate tube and the loose-fill insulation is disposed between the intermediate tube and the inner tube. In certain embodiments where the exhaust gas treatment device has an outer layer including an outer tube, an inner layer including an inner tube, or both an outer layer including an outer tube and the inner layer including an inner tube, the inner tube comprises a plurality of intake ends adapted to receive exhaust gases from an engine, the plurality of intake ends merging into a lesser number of tubes with an outlet end opposite the intake ends, and the outlet end is adapted to release exhaust gases into the atmosphere or to a downstream exhaust gas treatment device. In certain embodiments, the inner layer receives exhaust gases from an engine and the piece of fiber mat that at least partially prevents the loss of the loose-fill insulation from between the outer layer and the inner layer also significantly reduces the conduction of heat from the inner layer to the outer layer as compared to direct contact between the inner layer and outer layer. In certain embodiments where the exhaust gas treatment device has an outer layer including an outer tube, an inner layer including an inner tube, or both an outer layer including an outer tube and the inner layer including an inner tube, the outer tube is coated on at least a portion of its surface with chrome and the piece of fiber mat disposed between the inner tube and the outer tube has a thermal conductivity low enough to sufficiently block the transfer of heat from the inner tube to the outer tube, such that discoloration of the chrome is prevented. In certain embodiments where the exhaust gas treatment device has an outer layer including an outer tube, an inner layer including an inner tube, or both an outer layer including an outer tube and the inner layer including an inner tube, the outer tube is coated on at least a portion of its surface with chrome and the loose-fill insulation disposed between the outer tube and the inner tube sufficiently blocks the transfer of heat from the inner tube to the outer tube, such that discoloration of the chrome is prevented. In certain embodiments, the device further comprises a channel attached to at least the outer layer, the channel allows communication from the area adjacent to the inner surface of the inner layer to the area adjacent to the outer surface of the outer layer, and the channel is at least in part surrounded by a piece of fiber mat in the volume between the outer layer and the inner layer. In certain embodiments comprising a channel, the channel is a formed by a sensor boss. In certain embodiments comprising a channel, the piece of fiber mat that at least in part surrounds the channel forms a barrier that at least partially prevents the loss of the loose-fill insulation from an opening between the outside of the channel and the inner layer or outer layer.

In particular, another aspect of the invention provides for a method of manufacturing an exhaust gas treatment device. The method comprises placing a loose-fill insulation into the volume of space between an inner layer and an outer layer and positioning a piece of fiber mat between the outer layer and the inner layer to form a barrier that at least partially prevents the loss of the loose-fill insulation from the volume of space between the outer layer and the inner layer. In certain embodiments, the outer layer includes an outer tube and the inner layer includes an inner tube. In certain embodiments, the exhaust gas treatment device is selected from the group consisting of a manifold with a three-way catalyst, connecting pipe, a manifold, a muffler, an emissions control unit, a selective catalytic reduction (SCR) catalyst, a diesel particulate filter (DPF), a gasoline particulate filter (GPF), a thermal regeneration unit, a decomposition tube, an injector mounting location, a mixer, a DOC diesel oxidation catalyst, and a duct and box system. In certain embodiments, the loose-fill insulation is selected from the group consisting of an aerogel, perlite, and microporous insulation. In certain embodiments, the loose-fill insulation is introduced into the volume of space between the inner layer and the outer layer through an opening between the inner layer and the outer layer. In certain embodiments, the piece of fiber mat is held in place by a clamp or a ring before the loose-fill insulation is placed into the volume of space between the inner layer and the outer layer. In certain embodiments where the loose-fill insulation is introduced into the volume of space between the inner layer and the outer layer through an opening between the inner layer and the outer layer, after placing the loose-fill insulation into the volume of space between the inner layer and the outer layer, the distance or size of the opening between the inner layer and the outer layer through which the loose-fill insulation was introduced is reduced to at least in part prevent loss of the loose-fill insulation. In certain embodiments, the loose-fill insulation is introduced into the volume of space between the inner layer and the outer layer through one or more openings in the outer layer or the inner layer. In certain embodiments where the loose-fill insulation is introduced into the volume of space between the inner layer and the outer layer through one or more openings in the outer layer or the inner layer, after placing the loose-fill insulation into the volume of space between the inner layer and the outer layer, the one or more openings is plugged. In certain embodiments where the loose-fill insulation is introduced into the volume of space between the inner layer and the outer layer through one or more openings in the outer layer or the inner layer, the loose-fill insulation is introduced into the volume of space between the inner layer and the outer layer with compressed air. In certain embodiments where the loose-fill insulation is introduced into the volume of space between the inner layer and the outer layer through one or more openings in the outer layer or the inner layer, the method further comprises providing a vacuum within the space between the inner layer and the outer layer to aid in filling the space with the loose-fill insulation. In certain embodiments, during the step of placing the loose-fill insulation the method further comprises vibrating the exhaust gas treatment device to aid in the settling of the loose-fill insulation, and the character of the vibration is selected from the group consisting of a single frequency, random frequencies, a sinusoidal sweep profile, and combinations thereof. In certain embodiments, the loose-fill insulation fills substantially the entire volume between the outer layer and the inner layer.

In particular, another aspect of the invention provides for an exhaust gas treatment device that comprises an outer layer, an inner layer that is at least in part disposed within the outer layer, and a loose-fill insulation disposed in the volume between the outer layer and the inner layer, wherein the volume between the outer layer and the inner layer is contained within an airtight chamber. In certain embodiments, a piece of fiber mat is disposed between the outer layer and the inner layer and forms a barrier that at least partially prevents the movement of the loose-fill insulation. In certain embodiments, the exhaust gas treatment device is selected from the group consisting of a manifold with a three-way catalyst, connecting pipe, a manifold, a muffler, an emissions control unit, a selective catalytic reduction (SCR) catalyst, a diesel particulate filter (DPF), a gasoline particulate filter (GPF), a thermal regeneration unit, a decomposition tube, an injector mounting location, a mixer, a DOC diesel oxidation catalyst, and a duct and a box system. In certain embodiments, the loose-fill insulation is selected from the group consisting of an aerogel, perlite, and microporous insulation. In certain embodiments, the loose-fill insulation substantially fills the volume between the outer layer and the inner layer. In certain embodiments, the inner layer is the same as the outer surface of a substrate. In certain embodiments, the outer layer is coated on at least a portion of its surface with chrome and wherein the loose-fill insulation disposed between the outer layer and the inner layer sufficiently blocks the transfer of heat from the inner layer to the outer layer, such that discoloration of the chrome is prevented.

In particular, another aspect of the invention provides for a method of manufacturing an exhaust gas treatment device where the method comprises placing a loose-fill insulation into the volume of space between an inner layer and an outer layer and sealing the volume of space in an airtight chamber. In certain embodiments, a piece of fiber mat is disposed between the outer layer and the inner layer and forms a barrier that at least partially prevents the movement of the loose-fill insulation. In certain embodiments, the exhaust gas treatment device is selected from the group consisting of a manifold with a three-way catalyst, connecting pipe, a manifold, a muffler, an emissions control unit, a selective catalytic reduction (SCR) catalyst, a diesel particulate filter (DPF), a gasoline particulate filter (GPF), a thermal regeneration unit, a decomposition tube, an injector mounting location, a mixer, a DOC diesel oxidation catalyst, and a duct and box system. In certain embodiments, the loose-fill insulation is selected from the group consisting of an aerogel, perlite, and microporous insulation. In certain embodiments, the loose-fill insulation is introduced into the volume of space between the inner layer and the outer layer through an opening between the inner layer and the outer layer. In certain embodiments where the loose-fill insulation is introduced into the volume of space between the inner layer and the outer layer through an opening between the inner layer and the outer layer, after placing the loose-fill insulation into the volume of space between the inner layer and the outer layer, the distance or size of the opening between the inner layer and the outer layer through which the loose-fill insulation was introduced is reduced to form an airtight seal. In certain embodiments, the loose-fill insulation is introduced into the volume of space between the inner layer and the outer layer through one or more openings in the outer layer or the inner layer. In certain embodiments where the loose-fill insulation is introduced into the volume of space between the inner layer and the outer layer through one or more openings in the outer layer or the inner layer, after placing the loose-fill insulation into the volume of space between the inner layer and the outer layer, the one or more openings is sealed airtight. In certain embodiments, the loose-fill insulation is introduced into the volume of space between the inner layer and the outer layer with compressed air. In certain embodiments, the method further comprises providing a vacuum within the space between the inner layer and the outer layer. In certain embodiments, the loose-fill insulation fills substantially the entire volume between the outer layer and the inner layer.

In particular, another aspect of the invention provides for an exhaust gas treatment device that comprises an outer layer, an inner layer that is at least in part disposed within the outer layer, and a loose-fill insulation disposed in the volume between the outer layer and the inner layer, wherein a piece of fiber mat is disposed between the outer layer and the inner layer and forms a barrier that at least partially prevents the loss of the loose-fill insulation from the volume between the outer layer and the inner layer, and wherein the loose-fill insulation is capable of absorbing moisture. In certain embodiments, the exhaust gas treatment device is selected from the group consisting of a manifold with a three-way catalyst, connecting pipe, a manifold, a muffler, an emissions control unit, a selective catalytic reduction (SCR) catalyst, a diesel particulate filter (DPF), a gasoline particulate filter (GPF), a thermal regeneration unit, a decomposition tube, an injector mounting location, a mixer, a DOC diesel oxidation catalyst, and a duct and a box system. In certain embodiments, the loose-fill insulation is selected from the group consisting of an aerogel, perlite, and microporous insulation. In certain embodiments, the loose-fill insulation capable of absorbing moisture substantially fills the volume between the outer layer and the inner layer.

In particular, another aspect of the invention provides for a method of manufacturing an exhaust gas treatment device where the method comprises placing a loose-fill insulation into the volume of space between an inner layer and an outer layer and positioning a piece of fiber mat between the outer layer and the inner layer to form a barrier that at least partially prevents the loss of the loose-fill insulation from the volume of space between the outer layer and the inner layer, wherein the loose-fill insulation is capable of absorbing moisture. In certain embodiments, the exhaust gas treatment device is selected from the group consisting of a manifold with a three-way catalyst, connecting pipe, a manifold, a muffler, an emissions control unit, a selective catalytic reduction (SCR) catalyst, a diesel particulate filter (DPF), a gasoline particulate filter (GPF), a thermal regeneration unit, a decomposition tube, an injector mounting location, a mixer, a DOC diesel oxidation catalyst, and a duct and box system. In certain embodiments, the loose-fill insulation is selected from the group consisting of an aerogel, perlite, and microporous insulation. In certain embodiments, the loose-fill insulation fills substantially the entire volume between the outer layer and the inner layer.

In particular, another aspect of the invention provides for a method of thermal insulation within an exhaust gas treatment device of the invention where the method comprises providing moisture to the loose-fill insulation so that moisture is absorbed in the loose-fill insulation and providing a heated exhaust gas to the device, wherein the heat from the exhaust gas converts the moisture absorbed in the loose-fill insulation into a gas or steam. In certain embodiments, the loose-fill insulation is selected from the group consisting of an aerogel, perlite, and microporous insulation.

In particular, another aspect of the invention provides for an exhaust gas treatment device that comprises an outer layer, an inner layer that is at least in part disposed within the outer layer, and a loose-fill insulation disposed in the volume between the outer layer and the inner layer, wherein a piece of fiber mat is disposed between the outer layer and the inner layer and forms a barrier that at least partially prevents the loss of the loose-fill insulation from the volume between the outer layer and the inner layer, and wherein the device is configured to allow for airflow through the volume between the outer layer and the inner layer. In certain embodiments, the device is configured to direct airflow through the volume between the outer layer and the inner layer. In certain embodiments, the device is configured to force airflow through the volume between the outer layer and the inner layer. In certain embodiments, the exhaust gas treatment device is selected from the group consisting of a manifold with a three-way catalyst, connecting pipe, a manifold, a muffler, an emissions control unit, a selective catalytic reduction (SCR) catalyst, a diesel particulate filter (DPF), a gasoline particulate filter (GPF), a thermal regeneration unit, a decomposition tube, an injector mounting location, a mixer, a DOC diesel oxidation catalyst, and a duct and box system. In certain embodiments, the loose-fill insulation is selected from the group consisting of an aerogel, perlite, and microporous insulation. In certain embodiments, the loose-fill insulation substantially fills the volume between the outer layer and the inner layer. In certain embodiments, the device is configured such that at least a portion of the airflow through the device passes through the loose-fill insulation. In certain embodiments, the device is configured such that at least a portion of the airflow through the device is directed so that at least a portion of the airflow is concentrated on one or more areas within the device. In certain embodiments, the airflow through the device is air that has a temperature that is less than the ambient air temperature. In certain embodiments, the piece of fiber mat forms a barrier that at least partially prevents the loss of the loose-fill insulation through one or more openings in the inner layer or the outer layer.

In particular, another aspect of the invention provides for a method of manufacturing an exhaust gas treatment device where the method comprises placing a loose-fill insulation into the volume of space between an inner layer and an outer layer and positioning a piece of fiber mat between the outer layer and the inner layer to form a barrier that at least partially prevents the loss of the loose-fill insulation from the volume of space between the outer layer and the inner layer, wherein the exhaust gas treatment device is configured to allow for airflow through the volume between the outer layer and the inner layer. In certain embodiments, the device is configured to direct airflow through the volume between the outer layer and the inner layer. In certain embodiments, the device is configured to force airflow through the volume between the outer layer and the inner layer. In certain embodiments, the exhaust gas treatment device is selected from the group consisting of a manifold with a three-way catalyst, connecting pipe, a manifold, a muffler, an emissions control unit, a selective catalytic reduction (SCR) catalyst, a diesel particulate filter (DPF), a gasoline particulate filter (GPF), a thermal regeneration unit, a decomposition tube, an injector mounting location, a mixer, a DOC diesel oxidation catalyst, and a duct and box system. In certain embodiments, the loose-fill insulation is selected from the group consisting of an aerogel, perlite, and microporous insulation. In certain embodiments, the method comprises passing air through the volume of space between the inner layer and the outer layer. In certain embodiments, the air is forced through the volume of space between the inner layer and the outer layer by applying a pressure. In certain embodiments where the method comprises passing air through the volume of space between the inner layer and the outer layer, the air that is passed through the volume of space between the inner layer and the outer layer is air that has a temperature that is less than the ambient air temperature.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings.

BRIEF DESCRIPTION OF DRAWINGS

For a better understanding of the present invention, reference may be made to the accompanying drawings in which:

FIG. 3a is a cut-away side view of a muffler utilizing the present invention;

FIG. 3b is a cross-sectional view of a muffler of the present invention;

FIG. 7b is a cross-sectional view of the exhaust gas treatment device shown in FIG. 7a;

FIG. 11a is a cross-sectional view showing a representative example of an exhaust gas treatment device of the present invention showing an alternative configuration of an inner layer and an outer layer;

FIG. 11b is a perspective view showing a representative example of an exhaust gas treatment device of the present invention having multiple tube comprising inner layers disposed within an outer layer also encompassing loose-fill insulation;

FIG. 11c is a schematic drawing showing a representative example of an exhaust gas treatment device of the present invention showing an alternative configuration in which the outer layer is not a uniform or symmetric structure;

FIG. 12a is a schematic drawing illustrating a representative example of a method of manufacturing an exhaust gas treatment device of the present invention showing loose-fill insulation being poured through a gap between the inner layer and the outer layer;

FIG. 12b is a schematic drawing illustrating a representative example of a method of manufacturing an exhaust gas treatment device of the present invention showing loose-fill insulation being introduced into the volume of space between the inner layer and the outer layer through an opening in the outer layer, aided by a vacuum created within the volume.

Figure 1:
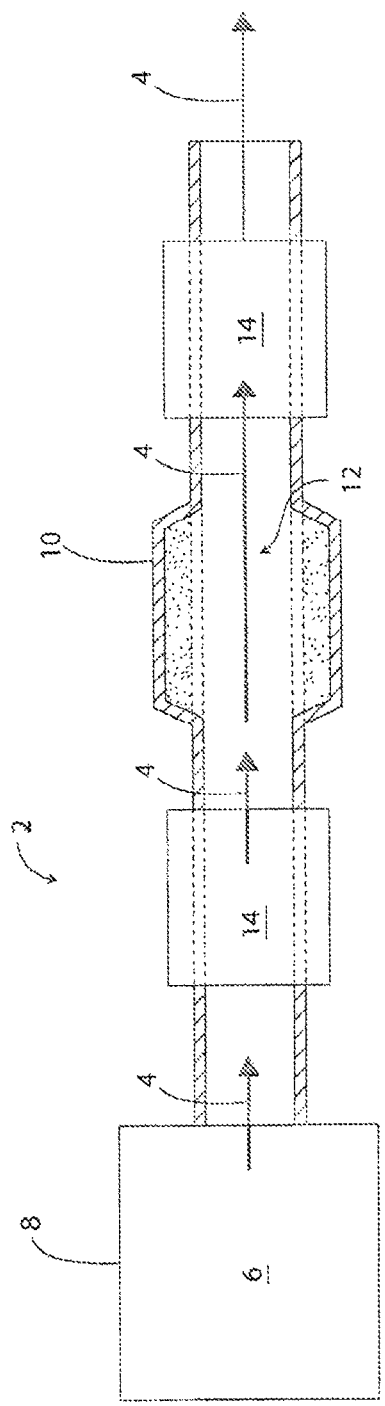
FIG. 1 is a schematic view showing a representative example of an exhaust gas system of the present invention.

Reference characters in the written specification indicate corresponding items shown throughout the drawing figures.

DETAILED DESCRIPTION OF THE INVENTION

In the following detailed description, numerous specific details are set forth in order to provide a thorough understanding of the invention. The following disclosed embodiments, however, are merely representative of the invention which may be embodied in various forms. It will be understood by those skilled in the art that the present invention may be practiced without these specific details. Thus, specific structural, functional, and procedural details described are not to be interpreted as limiting. In other instances, well-known methods, procedures, and components have not been described in detail so as to obscure the present invention.

Headings are provided herein solely for ease of reading and should not be interpreted as limiting.

Overview

Certain aspects of the present invention are drawn to an exhaust gas treatment device or an exhaust gas system wherein at least a part of the device or an element or component in the system utilizes a loose-fill insulation. In certain embodiments, the loose-fill insulation may be used in place of or in addition to the types of insulation currently used in such systems or devices, such as the current use of fiber glass or ceramic mat insulation. The loose-fill insulation may provide, for example, thermal and/or acoustic insulation to the system or device. In certain embodiments, the loose-fill insulation is at least in part prevented from spilling out of or being lost from the device by a barrier, such as a gasket, plug, stopper, covering, screen, cap, etc., made of a piece of fiber mat material. In addition to providing a physical barrier to prevent the loss of the loose-fill insulation, the barrier may itself act as insulation for various parts of the system or device. Methods are also provided for manufacturing an exhaust gas treatment device or exhaust gas system comprising a loose-fill insulation such as certain methods for incorporating the loose-fill-insulation into the device or system.

Exhaust Gas System or Device

The exhaust gas system or device of the invention may be any known exhaust gas system or device that comprises at least one volume wherein a loose-fill insulation may be encompassed or contained. For example, a component of an exhaust gas system may be placed within another structure, e.g., an exhaust tube placed inside of an outer housing tube of larger diameter, wherein a volume of space is formed between them that can be filled with a loose-fill insulation. In certain embodiments, a component of an exhaust gas system may be placed within another structure, e.g., a solid catalytic monolith placed inside of a housing or can, wherein a volume of space is formed between them that can be filled with a loose-fill insulation. Non-limiting, representative examples of an exhaust gas system or device of the invention include a manifold, a manifold with a three-way catalyst, connecting pipe, muffler, emissions control unit, selective catalytic reduction (SCR) catalyst, diesel particulate filter (DPF), gasoline particulate filter (GPF), thermal regeneration unit, decomposition tube, injector mounting location, a mixer, a DOC diesel oxidation catalyst, a duct and box system, and the like.

FIG. 1 is a schematic view showing a representative example of an exhaust gas system of the present invention generally indicated by numeral 2, in the form of a diesel exhaust gas aftertreatment system to treat the exhaust gases 4 from a combustion process 6, such as from a diesel compression engine 8. The system may include one or more exhaust gas acoustic and/or aftertreatment devices or components. Representative examples of such devices include catalytic converters, diesel oxidation catalysts, diesel particulate filters, gas particulate filters, lean $NO_x$ traps, selective catalytic reduction (SCR) catalysts, burners, manifolds, connecting pipes, mufflers, resonators, tail pipes, emission control system enclosure boxes, insulation rings, insulated end cones, insulated inlet pipes, and insulated outlet pipes. Some of these devices are components 10 having a central opening 12 through which exhaust gases 4 flow. The components may be made of various materials but often metal, such as stainless steel in the 300 or 400 family is used. In certain embodiments, these components are strictly metallic. Other devices can include a core 14, for example, in the form of a ceramic monolith structure and/or a woven metal structure through which the exhaust flows. These devices or systems are used, for example, in gasoline, diesel, and other combustion engine motor vehicles, construction equipment, lawn care equipment, locomotive engine applications, marine engine applications, small internal combustion engines, and stationary power generation.

Figure 2B:
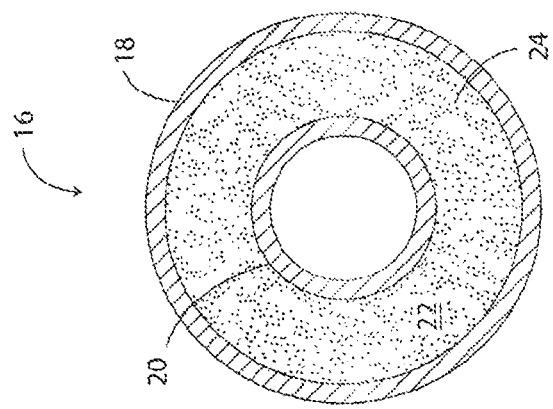
FIG. 2b is a cross-sectional view of an exhaust gas treatment device of the present invention, such as an element of the exhaust gas system of the present invention shown in FIG. 1.
Figure 2A:
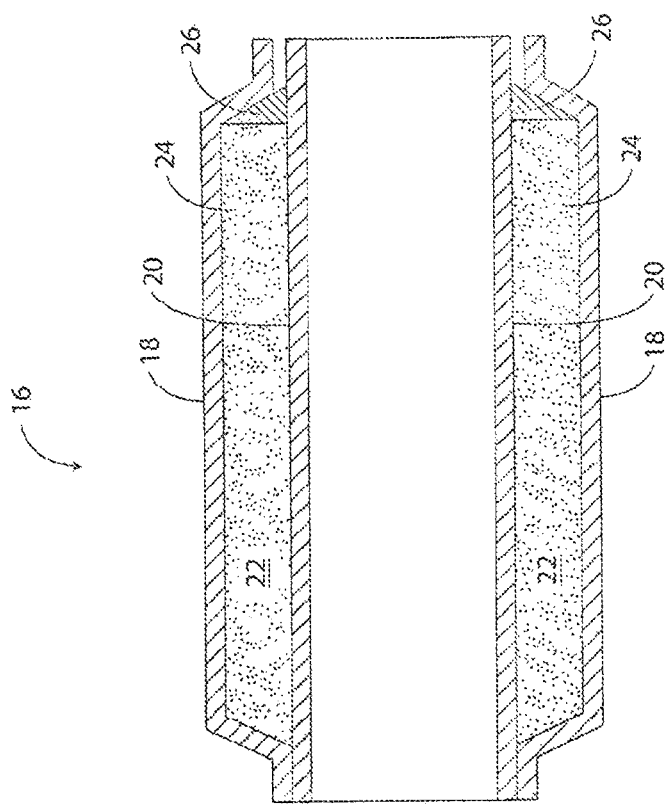
FIG. 2a is a cut-away side view of an exhaust gas treatment device of the present invention, such as an element of the exhaust gas system of the present invention shown in FIG. 1.

In certain embodiments of the present invention, an exhaust gas treatment device comprises an outer layer encompassing and an inner layer that is at least in part disposed within the outer layer. In certain embodiments, at least one end of the inner layer is configured and adapted to receive exhaust gases either directly or indirectly from an engine. FIG. 2a is a cut-away side view and FIG. 2b is a cross-sectional view showing representative illustrations of a representative example of an exhaust gas treatment device of the present invention generally indicated by numeral 16, having an outer layer 18 and an inner layer 20 that is disposed at least in part within the outer layer. The exhaust gas treatment device 16 comprises within the volume of space 22 between the outer layer 18 and the inner layer 20, a loose-fill insulation 24. FIGS. 11a, 11b, and 11c show representative alternative configurations, such as where the inner layer 20 is disposed against or coincides with the outer layer 18 such that the volume of space 22 does not completely surround the inner layer 20 (FIG. 11a), where the outer layer 18 may be a structure, such as a tube or box, comprising multiple separate inner layers 20, such as including multiple tubes, within the outer layer 18 (FIG. 11b), and wherein the outer layer 18, the inner layer 20, or both may be of an irregular shape (FIG. 11c). For example, a bag may be placed around a tube or other exhaust component so that the bag forms an outer layer 18 than can be filled with loose-fill insulation 24 around the inner component that forms an inner layer 20.

Referring again to FIG. 2a, in at least one place, a piece of fiber mat 26 is disposed between the outer layer 18 and the inner layer 20, and forms a barrier that at least partially prevents the loss of the loose-fill insulation 24 from the volume of space 22 between the outer layer 18 and the inner layer 20. In certain embodiments, the volume of space 22 between the outer layer 18 and the inner layer 20 may be partially filled wherein some or much of the volume is unfilled, such as wherein the loose-fill insulation 24 has great freedom of movement to move around. In certain embodiments, the volume may be substantially filled. In such embodiments, the movement of the loose-fill insulation 24 may be constrained and this may cause the particles of the loose-fill insulation 24 to tend to stay in place.

The loose-fill insulation 24 used may be any of several loose-fill insulations known in the field. Illustrative examples include aerogel, perlite, and microporous insulation.

In certain embodiments, the loose-fill insulation is a material capable of absorbing moisture. Moisture refers to the presence of liquid, for example, water. In certain embodiments, such loose-fill insulation capable of absorbing moisture is provided with moisture. The moisture may be provided by the user, such as by adding water to the insulation, or the absorption of moisture may occur during the operating cycle of the device such as from moist exhaust gases or condensation of moisture within the device. In certain embodiments, the device is configured to collect moisture or condensation and direct it into the loose-fill insulation. For example, an opening or vent may be place in a layer, such as at a low position where moisture or condensation collects, to allow the liquid to drain into the loose-fill insulation. The absorption of moisture by the insulation may help moderate temperature spikes, especially at the outer surface or skin of the device. During periods of operation where the rise of temperature is extreme, heat is transferred from hot exhaust gases across the inner layer of the device into the volume of space between the inner layer and the outer layer. This increases the temperature of the loose-fill insulation and the moisture contained therein. If enough heat is generated, it will result in a phase change of the absorbed liquid to a gas or steam, which will absorb heat. The gas or steam generated may be allowed to escape from the device, such as through an opening or vent. In certain embodiments, the opening or vent is too small to allow the loose-fill insulation to escape or the opening or vent is covered with a mesh or screen that allows the gas or steam to escape but contains the loose-fill insulation within the device. This process of allowing moisture absorbed within the loose-fill insulation to convert to a gas or steam at high exhaust gas temperatures may aid in thermal insulation from the device such as reducing the heat transferred to the outer layer of the exhaust gas treatment device. This is ideal for exhaust assemblies dealing with the heat of regeneration. A relatively short duration of a temperature spike may be manageable by moisture—even a small amount of moisture—absorbed in the loose-fill insulation. In certain embodiments, the insulating material is capable of absorbing up to about twice its weight in water. In certain embodiments, the insulating material is perlite.

FIG. 3a is a cut-away side view and FIG. 3b is a cross-sectional view of an exemplary embodiment of an exhaust gas treatment device of the present invention showing a muffler generally indicated by numeral 28. In certain embodiments of the invention, the outer layer includes an outer tube 30 and the inner layer includes an inner tube 32. For purposes of this disclosure, it is understood that reference to a layer includes embodiments wherein the layer includes a tube unless otherwise specified. Loose-fill insulation 24 is disposed in the volume of space 22 between the outer tube 30 and the inner tube 32. In at least one place, a piece of fiber mat 26 is disposed between the outer tube 30 and the inner tube 32 and forms a barrier that at least partially prevents the loss of the loose-fill insulation 24 from the volume of space 22 between the outer tube 30 and the inner tube 32.

Figure 4:
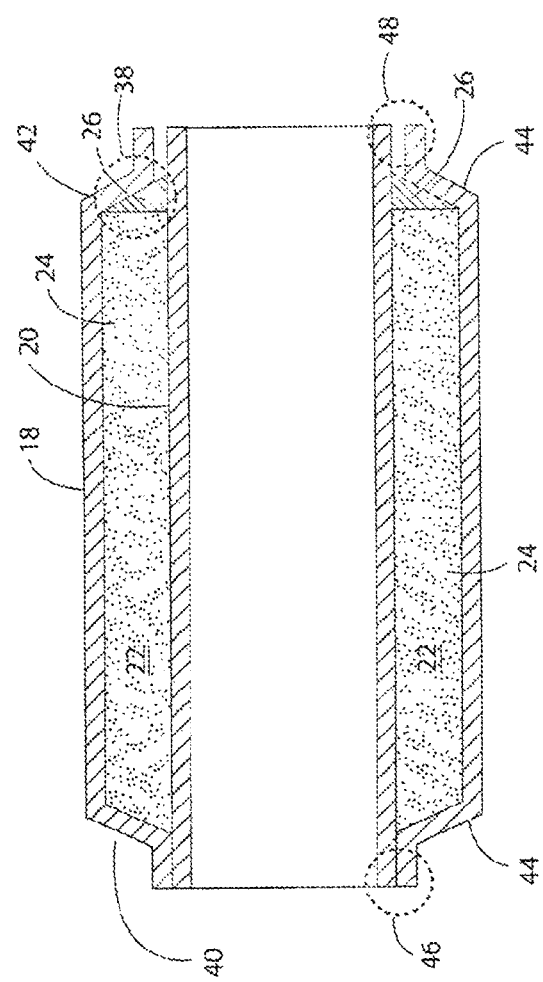
FIG. 4 is a cut-away side view of an exhaust gas treatment device of the present invention utilizing applied pressure to the piece of fiber mat.

As shown in FIG. 4, in certain embodiments of the present invention at least a portion of the outer layer 18 is constricted to apply a pressure 38 to the piece of fiber mat 26 and hold it against the inner layer 20. Alternatively, the inner layer 20 may expand towards the outer layer 18 to similarly apply a pressure to the piece of fiber mat 26 to hold it against the outer layer 18 or the inner layer 20 and the outer layer 18 may otherwise converge to apply a pressure to the piece of fiber mat 26 to hold it in place. In certain embodiments, the inner layer 20 and the outer layer 18 may not necessarily apply a pressure to the piece of fiber mat 26, but the piece of fiber mat 26 is still held in place by contact with the inner layer 20 and the outer layer 18. As shown in FIG. 4, in certain embodiments the outer layer 18 has a first end 40 and a second end 42. At either the first end 40, the second end 42, or both, at least a portion of the outer layer 18 is constricted to apply a pressure 38, or otherwise contact, the piece of fiber mat 26, wherein there is a constricted portion is tapered 44 toward the inner layer 20. In certain embodiments, where the outer layer 18 and the inner layer 20 come into proximity with each other, they may be joined together at one or more locations, e.g., ends 46, such as by crimping, fastening, or welding, as is known in the manufacture of exhaust gas treatment devices. Where the outer layer 18 and the inner layer 20 come into proximity with each other, there may also be a gap 48, such as to allow a slip-joint for thermal expansion and contraction. In certain embodiments, a piece of fiber mat 26 is located between the inner layer 20 and outer layer 18 to form a barrier that at least in part prevents loss of the loose-fill insulation 24 from the volume of space 22 between the inner layer 20 and outer layer 18. In addition to pressure or other physical impediment provided by the outer layer 18 or inner layer 20 to the piece of fiber mat 26, the piece of fiber mat 26 may alternatively or in addition to be held in place by a clamp, ring, clip, staple, rivet, tie, screw, or other fastening device. The piece of fiber mat may also be in part or in whole held in place by an adhesive material such as glue or tape. For example, a clamp may be used to provide an inward pressure holding a piece of fiber mat against the outer surface of the inner layer 20 or a ring may be used to provide an outward pressure holding a piece of fiber mat 26 may against the inner surface of the outer layer 18.

Figure 5C:
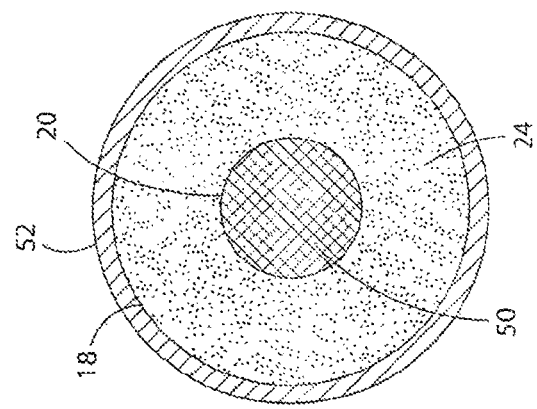
FIG. 5c is a cross-sectional view at point B showing a representative example of an exhaust gas treatment device of the present invention utilizing an outer surface of the outer surface of a solid or semi-solid structure, e.g., catalytic monolith substrate.
Figure 5B:
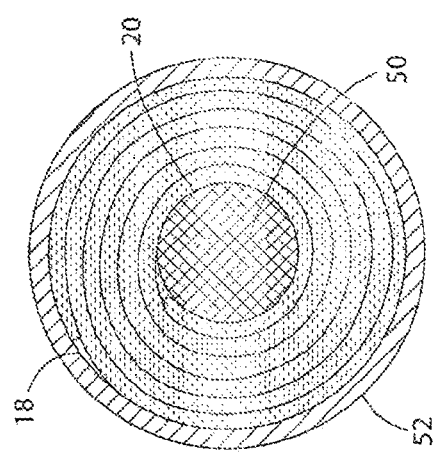
FIG. 5b is a cross-sectional view at point A showing a representative example of an exhaust gas treatment device of the present invention utilizing an outer surface of the outer surface of a solid or semi-solid structure, e.g., catalytic monolith substrate.
Figure 5A:
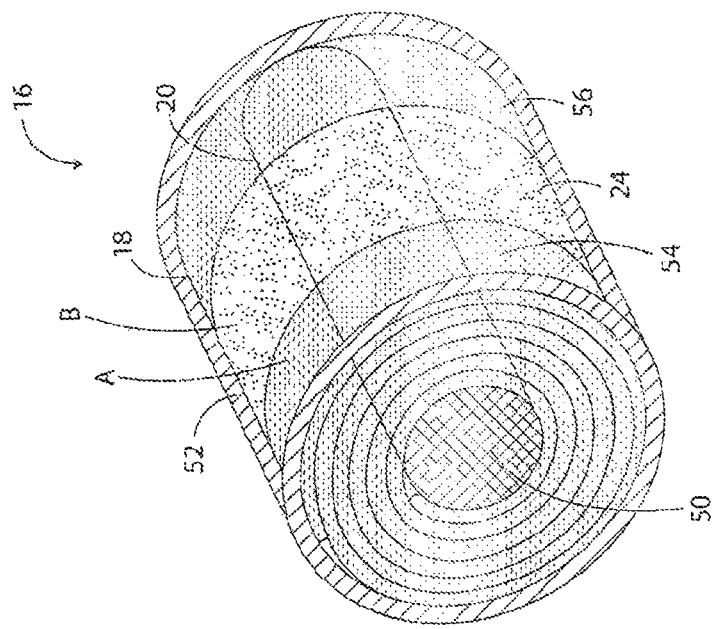
FIG. 5a is a perspective view showing a representative example of an exhaust gas treatment device of the present invention utilizing an outer surface of the outer surface of a solid or semi-solid structure, e.g., catalytic monolith substrate.

In certain embodiments of the present invention, the inner layer 20 may be the same as the outer surface of a solid or semi-solid structure such as the outer surface of a catalytic monolith substrate. FIG. 5a is a perspective view of a representative example of an exhaust gas treatment device of the present invention indicated generally by numeral 16. FIG. 5b is a cross-sectional view taken at point A of FIG. 5a showing a catalytic monolith substrate 50 surrounded by a can 52. FIG. 5c is a cross-sectional view taken at point B of FIG. 5a showing a catalytic monolith substrate 50 surrounded by a can 52. In certain embodiments, the substrate 50 is wrapped at least in part within the can 52 by at least a first piece of fiber mat 54 and a second piece of fiber mat 56 that are disposed at least in part in the volume between an outer layer 18 and an inner layer 20. In certain embodiments, the first and/or second piece of fiber mat 54, 56 surrounding the substrate 50 provides support to hold the substrate 50 in place. Loose-fill insulation 24 is at least located between the first piece of fiber mat 54 and the second piece of fiber mat 56 and within the volume between the outer layer 18 and the inner layer 20. The first piece of fiber mat 54, the second piece of fiber mat 56, and/or a separate additional piece of fiber mat may serve as a barrier to at least partially prevent the loss of the loose-fill insulation 24 from between the outer layer 18 and the inner layer 20.

Figure 6C:
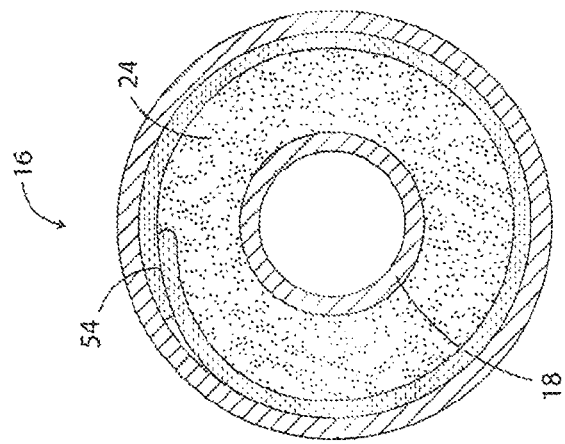
FIG. 6c is a cross-sectional view showing a representative example of an exhaust gas treatment device of the present invention where a piece of fiber mat is substantially disposed between the loose-fill insulation and the outer layer.
Figure 6B:
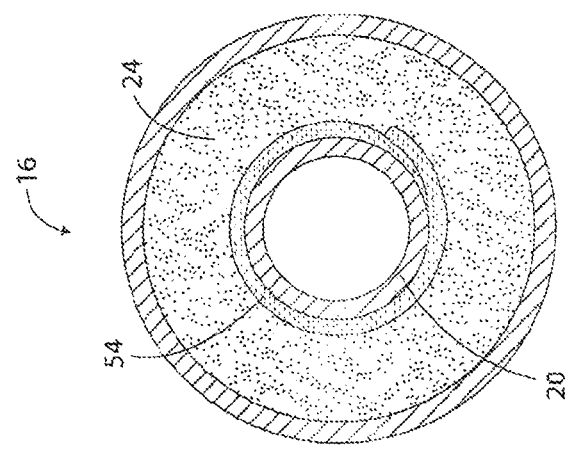
FIG. 6b is a cross-sectional view showing a representative example of an exhaust gas treatment device of the present invention where a piece of fiber mat is substantially disposed between the loose-fill insulation and the inner layer.
Figure 6A:
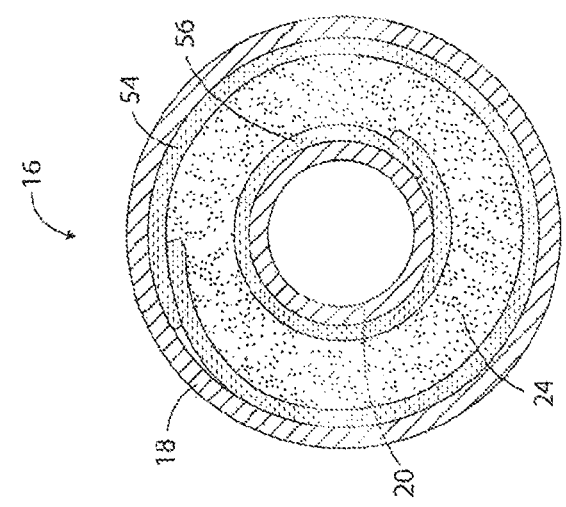
FIG. 6a is a cross-sectional view showing a representative example of an exhaust gas treatment device of the present invention where the loose-fill insulation is substantially disposed between a first piece of fiber mat that is disposed more closely to the inner layer of the device and a second piece of fiber mat that is disposed more closely to the outer layer of the device.

FIG. 6a is a cross-sectional view showing another embodiment of the present invention in which an exhaust treatment device of the present invention generally indicated by numeral 16 comprises a first piece of fiber mat 54 and a second piece of fiber mat 56 that are disposed at least in part in the volume between an outer layer 18 and an inner layer 20. In this embodiment, at least a part of the first piece of fiber mat 54 is disposed more closely to the inner layer 20 and at least a part of the second piece of fiber mat 56 is disposed more closely to the outer layer 18, or vice versa. At least a portion of the loose-fill insulation 24 is located between the first piece of fiber mat 54 and the second piece of fiber mat 56. The first piece of fiber mat 54, the second piece of fiber mat 56, and/or a separate additional piece of fiber mat may serve as a barrier to at least partially prevent the loss of the loose-fill insulation 24 from between the outer layer 18 and the inner layer 20.

FIG. 6b and FIG. 6c are cross-sectional views of representative examples of exhaust treatment devices of the present invention indicated generally by numeral 16 showing embodiments wherein at least a first piece of fiber mat 54 is substantially disposed between the loose-fill insulation 24 and the inner layer 20 (FIG. 6*b*) or is substantially disposed between the loose-fill insulation 24 and the outer layer 18 (FIG. 6*c*). The first piece of fiber mat 54 and/or a separate additional piece of fiber mat may serve as a barrier to at least partially prevent the loss of the loose-fill insulation 24 from between the outer layer 18 and the inner layer 20.

Figure 7A:
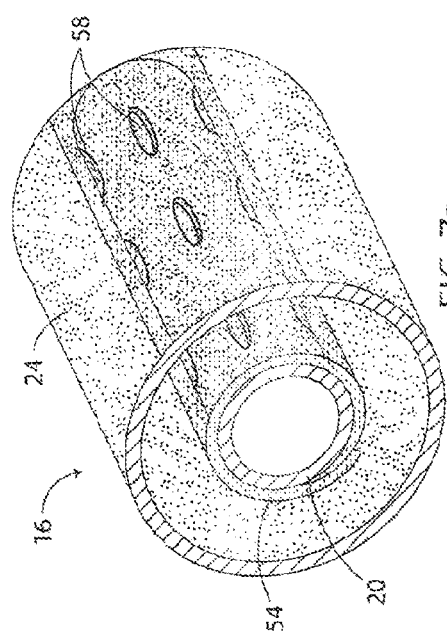
FIG. 7a is a perspective view showing a representative example of an exhaust gas treatment device of the present invention where a piece of fiber mat is substantially disposed between the loose-fill insulation and an inner layer comprising openings, where the piece of fiber mat at least partially prevents loss of the loose-fill insulation through the openings in the inner layer.
Figure 7B:
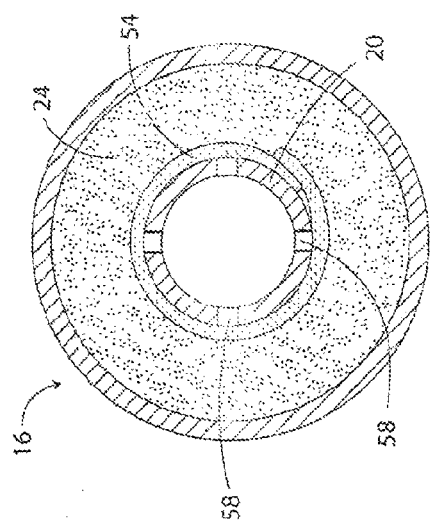
Figure 7C:
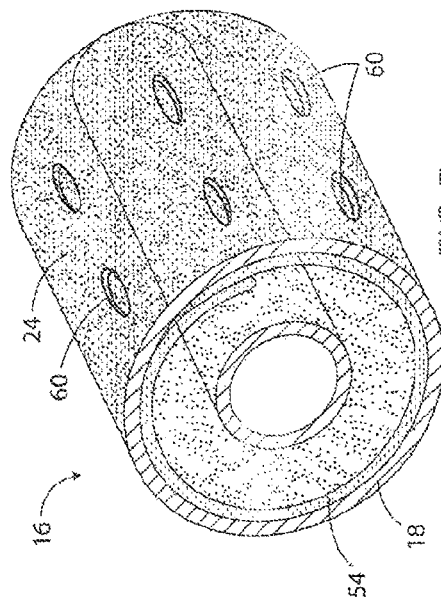
FIG. 7c is a perspective view showing a representative example of an exhaust gas treatment device of the present invention where a piece of fiber mat is substantially disposed between the loose-fill insulation and an outer layer comprising openings, where the piece of fiber mat at least partially prevents loss of the loose-fill insulation through the openings in the outer layer.
Figure 7D:
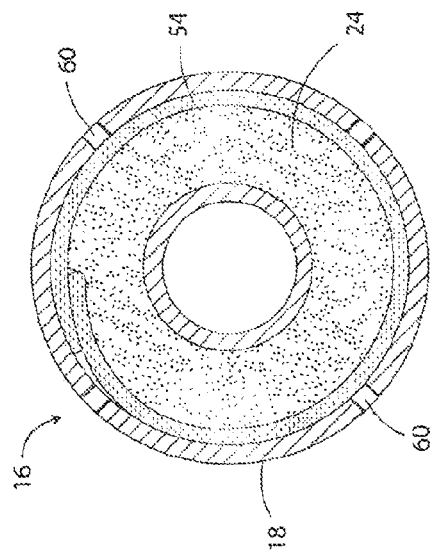
FIG. 7d is a cross-sectional view of the exhaust gas treatment device shown in FIG. 7c.
Figure 7E:
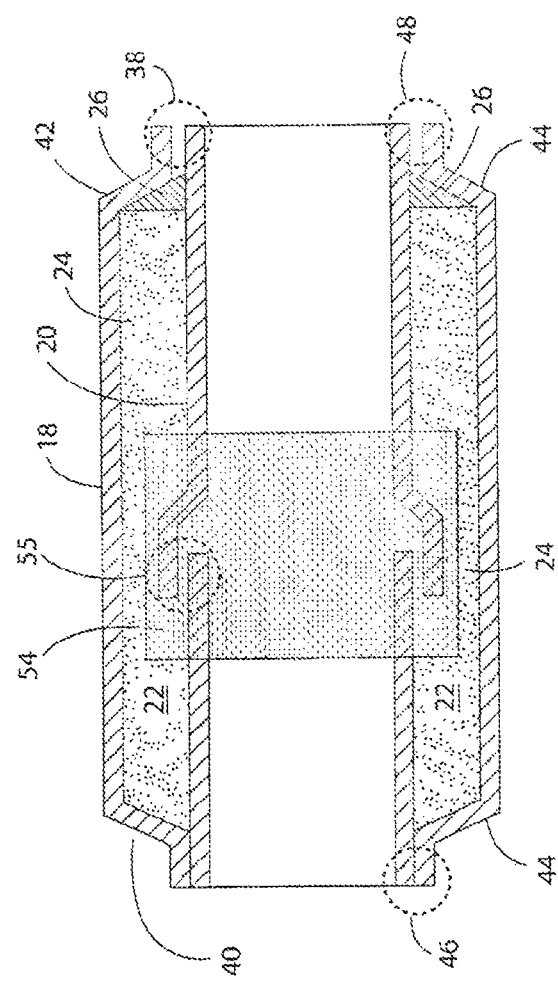
FIG. 7e is a cut-away side view showing a representative example of an exhaust gas treatment device of the present invention where a piece of fiber mat is substantially disposed between the loose-fill insulation and an inner layer comprising an opening, where the opening in the inner layer is a slip-joint, and where the piece of fiber mat at least partially prevents loss of the loose-fill insulation through the opening in the inner layer.

FIG. 7*a* is a perspective view and FIG. 7*b* is a cross-sectional view showing a representative example of an exhaust gas treatment device of the present invention indicated generally by numeral 16 wherein a piece of fiber mat 54 forms a barrier that at least partially prevents the loss of loose-fill insulation 24 through one or more first holes 58 in the inner layer 20. FIG. 7*c* is a perspective view and FIG. 7*d* is a cross-sectional view showing a representative example of an exhaust gas treatment device of the present invention indicated generally by numeral 16 wherein a piece of fiber mat 54 forms a barrier that at least partially prevents the loss of loose-fill insulation 24 through one or more second holes 60 in the outer layer 18. In certain embodiments, the piece of fiber mat 54 that at least partially prevent the loss of loose-fill insulation 24 is substantially disposed between the loose-fill insulation 24 and the inner layer 20 such as being wrapped around the outer surface of the inner layer 20 as shown in FIG. 7*b*. In certain embodiments, the piece of fiber mat 54 that at least partially prevent the loss of loose-fill insulation 24 is substantially disposed between the loose-fill insulation 24 and the outer layer 18 such as covering the inner surface of the outer layer 18 as shown in FIG. 7*d*. In certain embodiments wherein a piece of fiber mat 54 forms a barrier that at least partially prevents the loss of the loose-fill insulation 24 through one or more openings in the inner layer 20 or the outer layer 18, the piece of fiber mat 54 only prevents loss of the loose-fill insulation 24 though the one or more opening in the inner layer 20 or the outer layer 18. In certain embodiments wherein a piece of fiber mat 54 forms a barrier that at least partially prevents the loss of the loose-fill insulation 24 through one or more openings in the inner layer 20 or the outer layer 18, the piece of fiber mat 54 may also at least partially prevent the loss of loose-fill insulation 24 through any gaps between the inner layer 20 and outer layer 18 or any opening otherwise where the loose-fill insulation 24 could escape from volume between the inner layer 20 and the outer layer 18. As shown in FIG. 7*e*, rather than holes in the inner layer 20, an opening in the inner layer may be a slip-joint 55, such as a slip-joint surrounded by a piece of fiber mat 54 that forms a barrier that at least partially prevents the loss of the loose-fill insulation 24 through the opening in the inner layer.

Figure 8B:
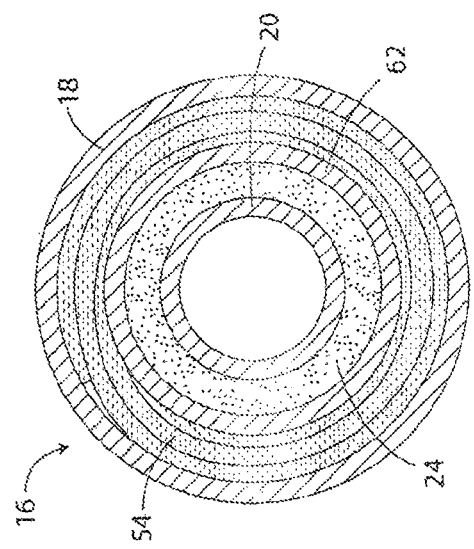
FIG. 8b is a cross-sectional view showing a representative example of an exhaust gas treatment device of the present invention having a fiber mat disposed between the outer layer and an intermediate layer and loose-fill insulation disposed between the intermediate layer and the inner layer.
Figure 8A:
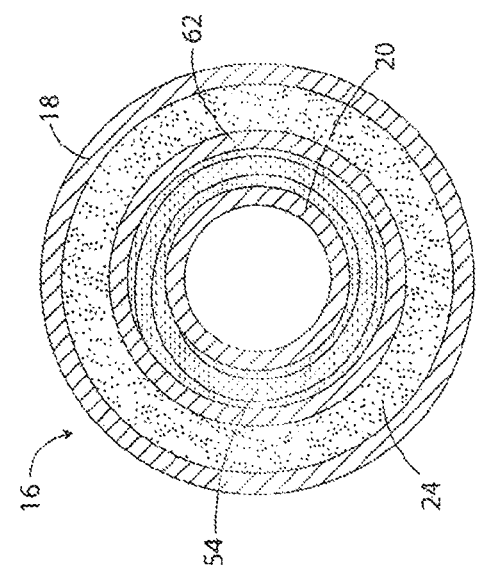
FIG. 8a is a cross-sectional view showing a representative example of an exhaust gas treatment device of the present invention having a loose-fill insulation disposed between the outer layer and an intermediate layer and a fiber mat disposed between the intermediate layer and the inner layer.

FIG. 8*a* is a cross-sectional view showing a representative example of an exhaust gas treatment device of the present invention indicated generally by numeral 16 that has an outer layer 18, and inner layer 20, and further has an intermediate layer 62 that is at least in part disposed between the outer layer 18 and the inner layer 20. In certain embodiments, loose-fill insulation 24 is disposed between the intermediate layer 62 and the outer layer 18. In certain embodiments, a fiber mat 54 is disposed between the intermediate layer 62 and the inner layer 20. FIG. 8*b* is a cross-sectional view showing a representative example of an exhaust gas treatment device of the present invention generally indicated by numeral 16 that has an outer layer 18, and inner layer 20, and further has an intermediate layer 62 that is at least in part disposed between the outer layer 18 and the inner layer 20. In certain embodiments, loose-fill insulation 24 is disposed between the intermediate layer 62 and the inner layer 20. In certain embodiments, a fiber mat 54 is disposed between the intermediate layer 62 and the outer layer 18. In certain embodiments, loose-fill insulation 24 is disposed both between the outer layer 18 and the intermediate layer 62 and between the intermediate layer 62 and the inner layer 20.

Figure 9:
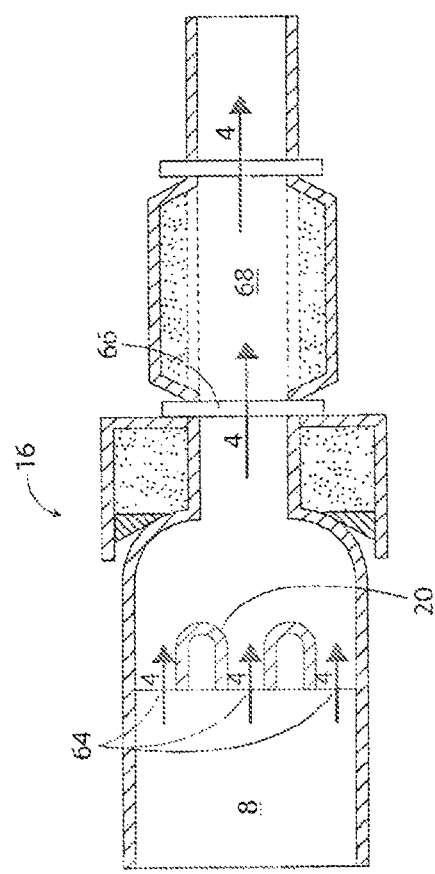
FIG. 9 is a schematic illustration showing a representative example of an exhaust gas treatment device of the present invention with an inner layer having a plurality of intake ends adapted to receive exhaust gases from an engine merging into a lesser number of tubes with an outlet end opposite the intake ends.

FIG. 9 is a schematic illustration showing a representative example of an exhaust gas treatment device of the invention indicated generally by numeral 16 wherein at least the inner layer 20 has a plurality of intake ends 64 adapted to receive exhaust gases 4 from an engine 8. The plurality of intake ends merge into a lesser number of tubes with an outlet end(s) 66 opposite the intake ends 64. The outlet end(s) 66 maybe adapted to release exhaust gases 4 into the atmosphere or to a downstream exhaust gas treatment device 68.

Figure 13:
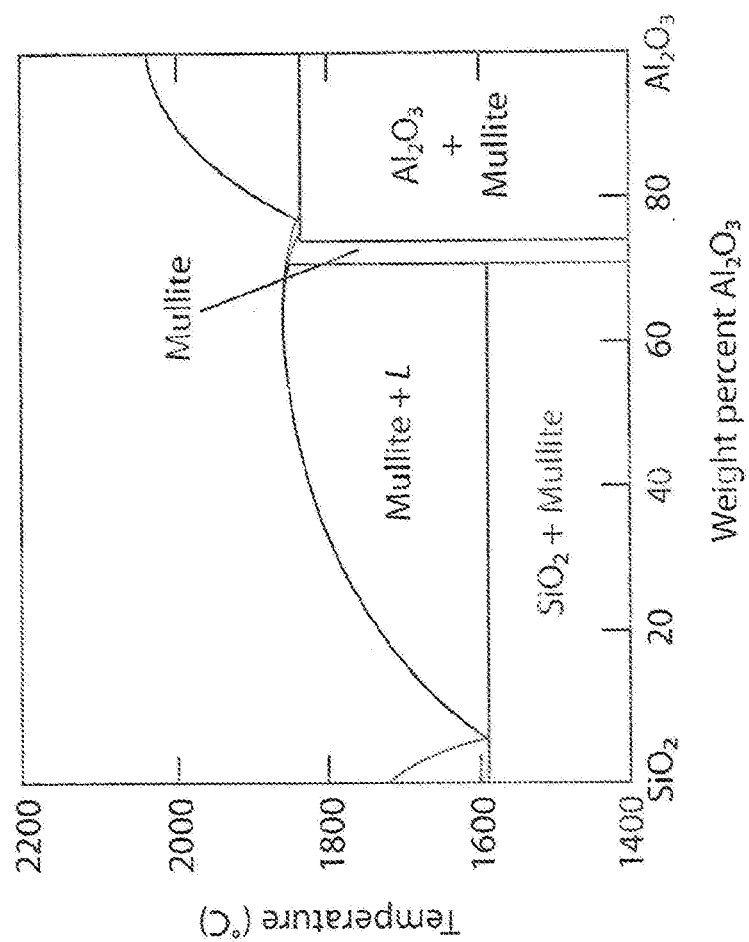
FIG. 13 is diagram showing the relationship of the amounts of $SiO_2$ and $Al_2O_3$ in a fiber material and their usefulness at high temperatures.

Fiber mat materials useful in the invention are known in the field. Representative examples of fiber mat material that can be used in the invention include $SiO_2$ and/or $Al_2O_3$ materials (FIG. 13) such as, but not limited to, glass fiber, RCF fiber (Unifrax), mullite, or Saffil® fiber. Glass fiber ($SiO_2$) is generally least inexpensive. Other materials may be partially $SiO_2$ with the balance being substantially $Al_2O_3$, such as RCF fiber or mullite. For use at the highest temperatures, substantially pure $Al_2O_3$ fibers such as Saffil® fiber which is 98% $Al_2O_3$, are preferred. In addition to composition, other properties of the fiber mat may be particularly desirable or undesirable for use in the present invention. For example, if a product contains fibers that are smaller in diameter than 3.5 µm and has a length to diameter ratio greater than a certain value, its use in Europe is restricted as it is classified as a probable carcinogen. Such products are required to be appropriately labeled and anyone using them has to report their use to the government. If the fiber distribution does not contain fibers below 3.5 µm and has been certified, then it is unclassified in Europe. Insulation fibers tend to be larger in diameter, and fiberglass materials are typically 9 µm in diameter. Preferably, fibers that are required to have definite mechanical properties will undergo heat treatment, also referred to as calcining. Even insulation, which has to hold itself in position against vibrational inputs, must have adequate mechanical properties and therefore is preferably heat treated. The heat treatment generally has to be done at a temperature higher than the maximum service temperature contemplated for the insulation or mat, or else the material will suffer a permanent set or shrinkage during any excursion above the heat treatment temperature. In reference to FIG. 13, mechanical properties increase from left to right on the diagram in a non-linear way. For example, substantially pure $Al_2O_3$ (Saffil®) has a tendency to brittleness so is weaker than mullite fiber, even though its temperature resistance is superior. Some fiber products have randomly oriented fibers such as is typical for products that are laid up wet in a slurry. Other products go through a needling process which improves the structural properties of the material and its resistance to erosion. Preferably, needling is done before calcining when the fibers are supple. After needling the calcination may be carried out to give the product its final properties. Needling is generally not feasible with fibers which are already calcined because calcined fibers are stiff and prone to breaking.

One of skill in the art would recognize how to handle such materials such as how to cut or size them and how to insert them into an exhaust gas treatment device. In certain embodiments, a piece of fiber mat 54 is a piece such as a plug, gasket, cap, etc. that blocks a gap or opening. In certain embodiments, a piece of fiber mat 54 may be a blanket and may be wrapped within the device. The fiber mat 54 may be chosen for its acoustic or thermal properties, such as how well it insulates. The fiber mat 54 may also be chosen according to the need for a desired density, compressivity, ability to withstand physical abrasion, etc. Because at least a portion of the fiber mat 54 disposed between the inner layer 20 and the outer layer 18 of an exhaust gas treatment device 16 of the invention forms a barrier that at least in part prevents the loss of loose-fill insulation 24 from the volume between the inner layer 20 and outer layer 18, at least a portion of the fiber mat 54 must be able to at least partially block the passage of a loose-fill insulation 24 of a certain size that is used in any particular embodiment.

In many exhaust gas treatment devices, an inner layer is disposed at least in part within an outer layer. Often there is a volume of space between the inner and outer layers. This space may itself impede thermal transfer between the inner layer and the outer layer. The space may additionally be filled with insulation to further prevent thermal transfer. However, often the inner layer and the outer layer come into close proximity or contact in at least one area, often at one or more ends of the exhaust gas treatment device. In certain embodiments, the piece of fiber mat that at least partially prevents the loss of the loose-fill insulation from the volume between the outer layer and the inner layer also significantly reduces the conduction of heat between the inner layer and the outer layer as compared to direct contact between the inner layer and the outer layer.

For example, where the inner layer comprising a tube receives hot exhaust gases from an engine, instead of directed contact between the inner layer and the outer layer which may be necessary to seal in loose-fill insulation in the volume between the inner layer and the outer layer, there may be a gap between the inner layer and the outer layer in at least one area, wherein loose-fill insulation is prevented from escaping through the gap by at least a piece of fiber mat and further the piece of fiber mat at that position significantly reduces the conduction of heat from the inner layer to the outer layer as compared to if the inner layer and the outer layer were in direct contact.

In certain embodiments, at least a portion of the outer tube of an exhaust gas treatment device is chrome coated, such as for decorative purposes. Although the look of a chrome exhaust is often desired, high exhaust temperatures can lead to discoloration of chrome. In certain embodiments, the piece of fiber mat that at least partially prevents the loss of the loose-fill insulation from the volume between the outer layer and the inner layer also sufficiently blocks the transfer of heat from the inner tube to the outer tube, such that discoloration of the chrome is prevented. In certain embodiments, the loose-fill insulation disposed between the outer tube and the inner tube sufficiently blocks the transfer of heat from the inner tube to the outer tube, such that discoloration of the chrome is prevented.

Figure 10:
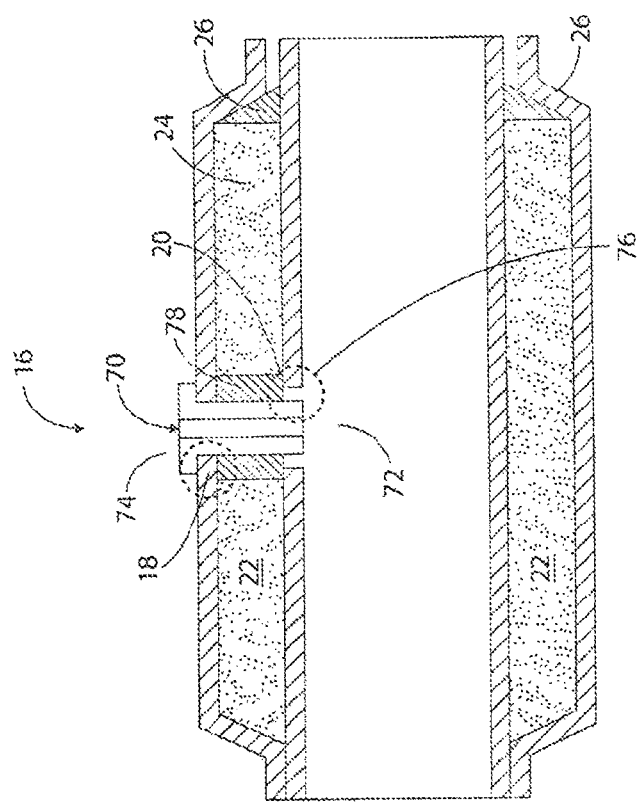
FIG. 10 is a cut-away side view showing a representative example of an exhaust gas treatment device of the present invention having a channel that allows communication from inside the interior of a tube comprising the inner layer to the exterior of the device.

FIG. 10 is a cut-away side view of a representative example of an exhaust gas treatment device of the invention generally indicated by numeral 16 having a channel 70 that that allows communication from the area adjacent to the inner surface of the inner layer 72 to the area adjacent to the outer surface of the outer layer 74. In certain embodiments, the channel is at least attached to the outer layer 18. The channel 70 may be attached to the inner layer 20 or there may be an opening, gap, or space 76 between the channel 70 and the inner layer 20, for example, to allow for thermal expansion. In certain embodiments, the channel is at least in part surrounded by a piece of fiber mat 78, which may form a barrier that at least partially prevents the loss of the loose-fill insulation 24 from the volume of space 22 between outside layer and the inside layer through an opening, gap, or space 76 between the outside of the channel and the inner layer or outer layer. In certain embodiments, the channel is formed by a sensor boss.

Certain embodiments of the exhaust gas treatment device of the invention provide for a sealed and airtight chamber containing the loose-fill insulation. For example, a device having an outer layer and an inner layer that is disposed at least in part within the outer layer, wherein the device comprises a volume of space between the outer layer and the inner layer containing a loose-fill insulation and the volume is contained within a sealed and airtight chamber. In certain embodiments, the sealed insulation chamber may: a) work as a pressure vessel or b) contain a vacuum created by removing at least a portion of the air out of the chamber. Illustrative methods of sealing the chamber include, but are not limited to, welding, crimping, and/or curling the components together. In certain embodiments, the outer layer, inner layer, or both may comprise a tube.

In addition to certain insulating effects of sealing the chamber, a sealed chamber would prevent any loss of loose-fill insulation that may occur in embodiments of the exhaust gas treatment device of the invention in which the volume of space between the inner layer and the outer layer is completely sealed off from the exterior environment. In certain embodiments, the exhaust gas treatment device comprises one or more pieces of fiber mat disposed between the outer layer and the inner layer which forms a barrier that at least partially restricts the movement of the loose-fill insulation, even though it is sealed within the insulation chamber. In certain embodiments, the exhaust gas treatment device comprising an airtight chamber containing the volume of space between the inner layer and the outer layer is configured in a manner described elsewhere in this application.

Figure 14:
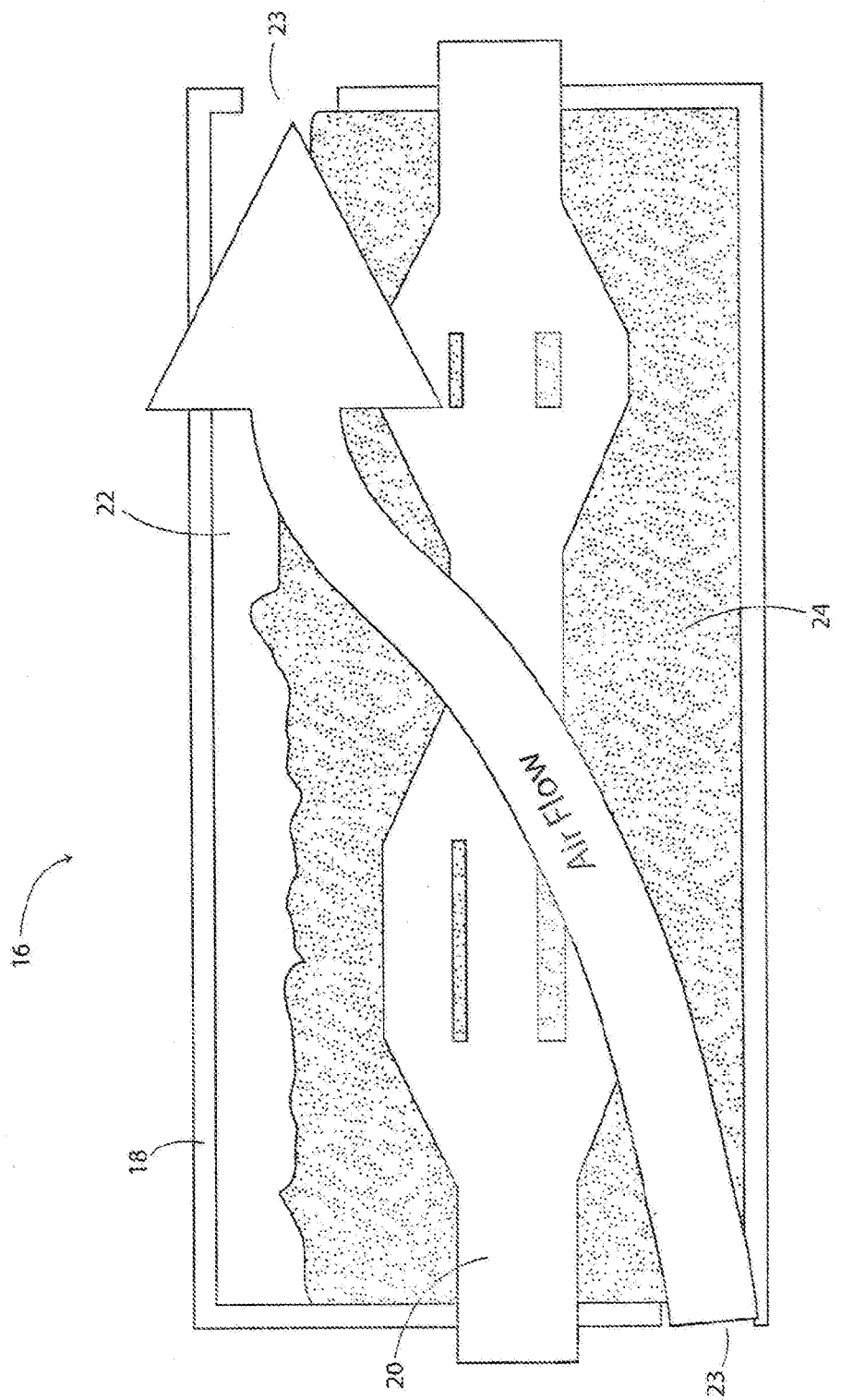
FIG. 14 is a cut-away side view representation of an exhaust gas treatment device of the present invention showing air flow through the loose-fill insulation which provides for convection heat loss as well as radiation blocking.
Figure 15:
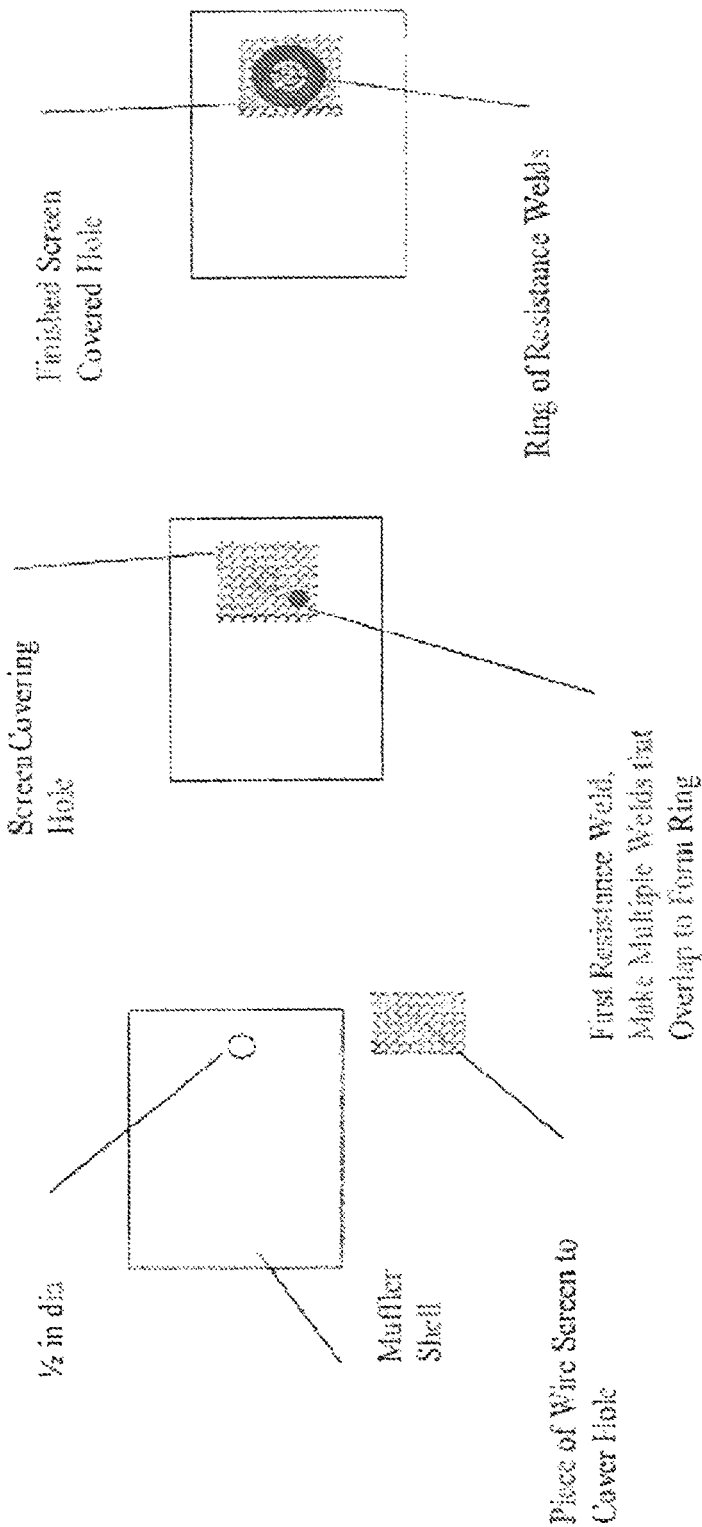
FIG. 15 shows an example of how an opening may be covered by a wire screen to contain the loose-fill insulation within the volume of space between the outer layer and the inner layer.

Certain embodiments of an exhaust gas treatment device of the invention provide for a combination of convection heat loss and radiation blocking. In particular, certain embodiments of an exhaust gas treatment device of the invention are configured to allow for airflow through the volume between the outer layer and the inner layer. Providing for convention heat loss is a method of thermal insulation from the device and may be especially effective in reducing the outer or skin temperature of an exhaust gas treatment device. In certain embodiments, the exhaust gas treatment device is one that functions constantly. FIG. 14 is a cut-away side view representation of an embodiment wherein the exhaust gas treatment device is generally indicated by numeral 16. The device has an outer layer 18 and an inner layer 20 that is disposed at least in part within the outer layer. In certain embodiments, the outer layer, inner layer, or both may comprise a tube. The exhaust gas treatment device 16 comprises within the volume of space 22 between the outer layer 18 and the inner layer 20, a loose-fill insulation 24. Further, the device is configured to allow for, or preferably encourage or direct, airflow through the volume between the outer layer and the inner layer. Such air flow may aid in thermal insulation. The air flow may be directed and pass through the loose-fill insulation or it may flow around the loose-fill insulation. The air flow is provided into the volume of space between the outer and the inner layer by openings or vents 23 through which the air enters and exits the device passively, or the air may be pumped or forced through the device. The air may be forced into the device by air pressure, such as produced by a moving vehicle, or by for example, a pump or a fan. FIG. 15 shows an example of how an opening may be covered by a wire screen to contain the loose-fill insulation within the volume of space between the outer layer and the inner layer and still allow air to pass into or exit the device. The temperature of the air may be that of ambient air, or the temperature may be other than that of the ambient air temperature, such as cooled or chilled air. The air flow may be directed or targeted at certain portions of the device where additional cooling or thermal insulation may be desired, such as at or around wires, sensors, and bosses.

Optionally, differential air pressure that utilizes a screen provides a mechanism for compacting the loose-fill material. Optionally, vibration can also be utilized for compaction of the loose-fill particles of perlite. Either differential air pressure or vibration or both differential air pressure and vibration can be utilized.

This provides preferred results in operation for cooling and thermal insulation. When the perlite material is placed in a vertical tube, there is a density of the loose-fill material that is generally known as the free height density or otherwise known as a bulk density or loose density. Preferably, by utilizing compaction, which can include sorting and nesting of the perlite, the range of density of about 1.05 to about 2.0 times the loose density with the preferred range of density is about 1.25 to about 1.6 times the loose density of the perlite. The range of density is measured when the perlite is dry rather than wet since perlite can easily absorb significant amounts of moisture that dramatically alters the density of the perlite. The term "dry" is defined as having a maximum of 0.5% free moisture.

In certain embodiments, the exhaust gas treatment device configured to allow for airflow through the volume between the outer layer and the inner layer has a structure as described elsewhere in this application and allows for airflow through the volume between the outer layer and the inner layer.

Methods of Manufacturing

Certain embodiments of the invention provide for methods of manufacturing an exhaust gas treatment device or system. In one exemplary embodiment, a loose-fill insulation is placed into the volume of space formed between an inner layer and an outer layer of an exhaust gas treatment device, and a piece of fiber mat is also placed between the inner layer and the outer layer wherein the positioning of the piece of fiber mat at least in part prevents the loss of the loose-fill insulation from the volume of space between the outer layer and the inner layer. In certain embodiments, the outer layer includes and outer tube, the inner layer includes an inner tube, or both the outer layer includes and outer tube and the inner layer includes an inner tube. The volume of space between the inner and outer layers or inner and outer tubes may be filled to various extents by the loose-fill insulation. For example, in certain embodiments, the loose-fill insulation fills substantially the entire volume between the outer layer and the inner layer.

The exhaust gas treatment device or system manufactured may be one of many exhaust gas treatment devices or systems known in the field including, but not limited to, those selected from the group consisting of a manifold with a three-way catalyst, connecting pipe, a manifold, a muffler, an emissions control unit, a selective catalytic reduction (SCR) catalyst, a diesel particulate filter (DPF), a gasoline particulate filter (GPF), a thermal regeneration unit, a decomposition tube, an injector mounting location, a mixer, a DOC diesel oxidation catalyst, and a duct and box system.

The loose-fill insulation used may be any of several loose-fill insulations known in the field. Illustrative examples include aerogel, perlite, and microporous insulation.

Fiber mat materials useful in the invention are known in the field. Representative examples of fiber mat material that can be used in the invention include $SiO_2$ and/or $Al_2O_3$ materials (FIG. 13) such as, but not limited to, glass fiber, RCF fiber (Unifrax), Mullite, or Saffil® fiber. Glass fiber ($SiO_2$) is generally least inexpensive. Other materials may be partially $SiO_2$ with the balance being substantially $Al_2O_3$, such as RCF fiber or mullite. For use at the highest temperatures, substantially pure $Al_2O_3$ fibers such as Saffil® fiber which is 98% $Al_2O_3$, are preferred. In addition to composition, other properties of the fiber mat may be particularly desirable or undesirable for use in the present invention. For example, if a product contains fibers that are smaller in diameter than 3.5 μm and has a length to diameter ratio greater than a certain value, its use in Europe is restricted as it is classified as a probable carcinogen. Such products are required to be appropriately labeled and anyone using them has to report their use to the government. If the fiber distribution does not contain fibers below 3.5 μm and has been certified, then it is unclassified in Europe. Insulation fibers tend to be larger in diameter, and fiberglass materials are typically 9 μm in diameter. Preferably, fibers that are required to have definite mechanical properties will undergo heat treatment, also referred to as calcining. Even insulation, which has to hold itself in position against vibrational inputs, must have adequate mechanical properties and therefore is preferably heat treated. The heat treatment generally has to be done at a temperature higher than the maximum service temperature contemplated for the insulation or mat, or else the material will suffer a permanent set or shrinkage during any excursion above the heat treatment temperature. In reference to FIG. 13, mechanical properties increase from left to right on the diagram in a non-linear way. For example, substantially pure $Al_2O_3$ (Saffil®) has a tendency to brittleness so it is weaker than mullite fiber, even though its temperature resistance is superior. Some fiber products have randomly oriented fibers such as is typical for products that are laid up wet in a slurry. Other products go through a needling process which improves the structural properties of the material and its resistance to erosion. Preferably, needling is done before calcining when the fibers are supple. After needling the calcination may be carried out to give the product its final properties. Needling is generally not feasible with fibers which are already calcined because calcined fibers are stiff and prone to breaking.

One of skill in the art would recognize how to handle such materials such as how to cut or size them and how to insert them into an exhaust gas treatment device. In certain embodiments, a piece of fiber mat is a piece such as a plug, gasket, cap, etc. that blocks a gap or opening. In certain embodiments, a piece of fiber mat may be a blanket and may be wrapped within the device. The fiber mat may be chosen for its acoustic or thermal properties, such as how well it insulates. The fiber mat may also be chosen according to the need for a desired density, compressivity, ability to withstand physical abrasion, etc. Because at least a portion of the fiber mat disposed between the inner and the outer layers of an exhaust gas treatment device of the invention forms a barrier that at least in part prevents the loss of loose-fill insulation from the volume between the inner and outer layers, at least a portion of the fiber mat must be able to at least partially block the passage of a loose-fill insulation of a certain size that is used in any particular embodiment.

Figure 16:
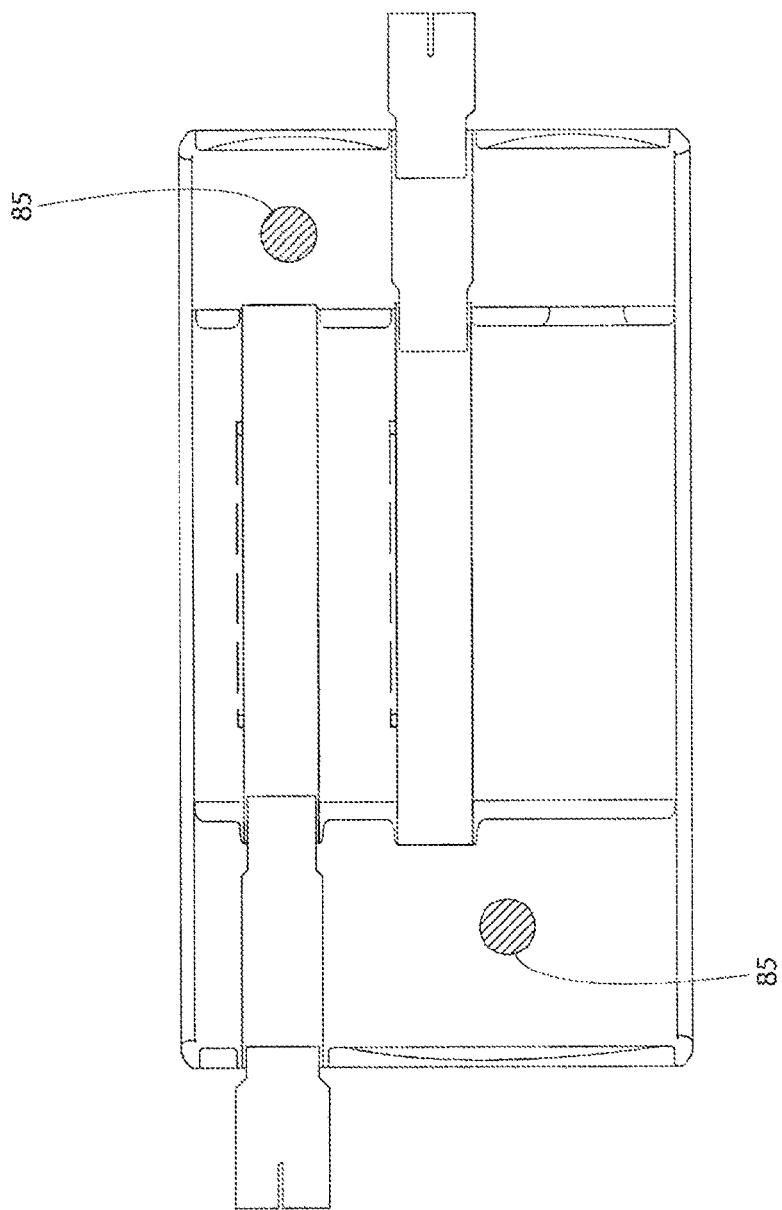
FIG. 16 is a cut-away view of a representative muffler embodiment of the present invention showing openings wherein loose-fill insulation may be introduced into the volume of space between the outer layer and the inner layer.

One aspect of a method of manufacturing of the present invention is placing the loose-fill insulation into the volume of space between the inner layer and the outer layer of an exhaust gas treatment device. In certain embodiments, this may be done by introducing the loose-fill insulation through an opening, space, gap, slit, etc. between the inner and outer layer. FIG. 16 is a cut-away view a representative muffler embodiment of the present invention showing openings 85 wherein loose-fill insulation may be introduced into the volume of space between the outer layer and the inner layer. In certain embodiments, the loose-fill insulation may be introduced through the application of compressed air. Alternatively, one or more of the openings 85 may also be used to apply a vacuum to the volume of space between the outer layer and the inner layer.

In certain embodiments, a piece of fiber mat is held into place by a clamp or ring before the loose-fill insulation is placed into the volume of space between the inner layer and the outer layer. In certain embodiments, a piece of fiber mat is held into place other means such as described herein before the loose-fill insulation is placed into the volume of space between the inner layer and the outer layer. In certain embodiments, where the loose-fill insulation is introduced through an opening, space, or gap, slit, etc. between the inner or outer layer, the distance or size of the opening is reduced after the introduction to at least in part prevent the loss of the loose-fill insulation back through the opening through which the loose-fill insulation was introduced. In certain embodiments, where the loose-fill insulation is introduced through an opening, space, gap, slit, etc. between the inner and outer layer, the opening, space, gap, slit, etc. between the inner and outer layer is at least partially blocked by a piece of fiber mat after the introduction to at least in part prevent the loss of the loose-fill insulation back through the opening through which the loose-fill insulation was introduced.

In certain embodiments of manufacturing of the present invention, the loose-fill insulation is introduced into the volume of space between the inner layer and the outer layer through one or more openings or holes in the outer layer and/or in the inner layer. The use of multiple holes may be beneficial to achieve even distribution of the loose-fill insulation within the volume of space between the inner layer and the outer layer. In certain embodiments, after the loose-fill insulation is placed into the volume of space between the inner layer and the outer layer, the one or more openings is plugged or otherwise obstructed to prevent loss of the loose-fill insulation back through the openings. In certain embodiments, the openings are at least in part plugged or blocked by one or more pieces of fiber mat, or the loss of the loose-fill insulation back through the openings is otherwise prevented at least in part by one or more pieces of fiber mat.

In general, loose-fill insulation is comprised of separate particles and is flowable in nature. In certain embodiments of manufacturing of the present invention, the loose-fill insulation may be introduced into the volume of space between the inner layer and the outer layer by pouring or depositing the loose-fill insulation into the space. This method may be especially useful where the volume to be filled is easily accessible. FIG. 12a is a schematic illustration showing a representative example of a method of manufacturing of the present invention where an exhaust gas treatment device indicated generally by numeral 16 having an inner layer 20, and outer layer 18, and a volume of space 22 between the inner layer 20 and the outer layer 18 is filled by pouring the loose-fill insulation 24 through a gap 48 between the inner layer 20 and the outer layer 18. In certain embodiments, however, it may be more difficult for the loose-fill insulation to access all of the volume to be filled. FIG. 12b shows a schematic illustration showing a representative example of a method of manufacturing of the present invention where an exhaust gas treatment device indicated generally by numeral 16 having an inner layer 20, and outer layer 18, and a volume of space 22 between the inner layer 20 and the outer layer 18 is filled by introducing the loose-fill insulation 24 into the volume of space 22 between the inner layer 20 and the outer layer 18 through an opening or hole 60 in the outer layer. In certain embodiments, the loose-fill insulation is introduced with the aid of compressed air 80. FIG. 12b also illustrates an embodiment in which a vacuum 82 is provided within the volume of space 22 between the inner layer 20 and the outer layer 18 by pulling air through an opening or hole 60 in the outer layer 18 to aid in the filling of the volume of space 22 between the inner layer 20 and the outer layer 18 with loose-fill insulation 24. It is understood that either of the one or more holes or openings through which the loose-fill insulation 24 is introduced or from which the vacuum is applied could also be located on the inner layer 20. In certain embodiment, the loose-fill insulation 24 is at least in part prevented from being pulled back out of the volume of space 22 between the inner layer 20 and the outer layer 18 by a mesh, screen, fiber mat, or a plurality of openings too small to allow the loose-fill insulation to pass. It is also understood that the loose-fill insulation 24 can be introduced using any combination of pouring/depositing, introduction with compressed air, or the aid of a vacuum.

It should be understood that when introducing elements of the present invention in the claims or in the above description of the preferred embodiment of the invention, the terms "have," "having," "includes" and "including" and similar terms as used in the foregoing specification are used in the sense of "optional" or "may include" and not as "required." Similarly, the term "portion" should be construed as meaning some or all of the item or element that it qualifies.

Thus, there have been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims that follow.

The invention claimed is:

1. A method of manufacturing an exhaust gas treatment device, the method comprising placing a loose-fill insulation into the volume of space between an inner layer and an outer layer and positioning a piece of fiber mat between the outer layer and the inner layer to form a barrier that at least partially prevents the loss of the loose-fill insulation from the volume of space between the outer layer and the inner layer but does not create an airtight seal, wherein during the step of placing the loose-fill insulation the method further comprises compacting the loose-fill insulation resulting in a density of the loose-fill insulation that is greater than a bulk density for the loose-fill material, and wherein the exhaust gas treatment device is configured to pass air through the volume of space between the inner layer and the outer layer by applying a pressure produced by a moving vehicle.

2. The method of manufacturing an exhaust gas treatment device according to claim 1, wherein the step of compacting the loose-fill insulation includes utilizing differential air pressure.

3. The method of manufacturing an exhaust gas treatment device according to claim 1, wherein the step of compacting the loose-fill insulation includes utilizing a screen.

4. The method of manufacturing an exhaust gas treatment device according to claim 1, wherein the step of compacting the loose-fill insulation further comprises vibrating the exhaust gas treatment device to aid in the settling of the loose-fill insulation.

5. The method of manufacturing an exhaust gas treatment device according to claim 3, wherein the step of compacting the loose-fill insulation further comprises vibrating the exhaust gas treatment device to aid in the settling of the loose-fill insulation.

6. The method of manufacturing an exhaust gas treatment device according to claim 1, wherein the compacted loose-fill insulation is dry perlite and is in a range of density from about 1.05 to about 2.0 times a loose density of the perlite insulation.

7. The method of manufacturing an exhaust gas treatment device according to claim 1, wherein the compacted loose-fill insulation is dry perlite and is in a range of density from about 1.25 to about 1.6 times a loose density of the perlite insulation.

8. The method of manufacturing an exhaust gas treatment device of claim 1, wherein the exhaust gas treatment device is configured to allow for airflow through the volume between the outer layer and the inner layer.

9. The method of manufacturing an exhaust gas treatment device according to claim 8, wherein the device is configured to direct airflow through the volume between the outer layer and the inner layer.

10. The method of manufacturing an exhaust gas treatment device according to claim 9, wherein the directed airflow provides for convection heat loss.

11. The method of manufacturing an exhaust gas treatment device according to claim 10, wherein the directed airflow has a temperature that is less than the ambient air temperature.

12. The method of manufacturing an exhaust gas treatment device according to claim 10, wherein the convection heat loss reduces the temperature of the outer layer.

13. The method of manufacturing an exhaust gas treatment device according to claim 10, wherein the directed airflow is directed through the loose-fill insulation.

14. The method of manufacturing an exhaust gas treatment device according to claim 10, wherein the directed airflow is directed around the loose-fill insulation.

* * * * *